US011430984B2

(12) United States Patent
Freeman et al.

(10) Patent No.: US 11,430,984 B2
(45) Date of Patent: Aug. 30, 2022

(54) ELECTRODES INCLUDING A PASSIVATION LAYER

(71) Applicant: The Johns Hopkins University, Baltimore, MD (US)

(72) Inventors: Adam W. Freeman, Laurel, MD (US); Konstantinos Gerasopoulos, Odenton, MD (US); Spencer A. Langevin, Odenton, MD (US)

(73) Assignee: The Johns Hopkins University, Baltimore, MD (US)

( * ) Notice: Subject to any disclaimer, the term of this patent is extended or adjusted under 35 U.S.C. 154(b) by 408 days.

(21) Appl. No.: 16/558,044

(22) Filed: Aug. 31, 2019

(65) Prior Publication Data

US 2021/0280851 A1 Sep. 9, 2021

Related U.S. Application Data

(60) Provisional application No. 62/840,050, filed on Apr. 29, 2019.

(51) Int. Cl.
| H01M 4/36 | (2006.01) |
| H01M 4/04 | (2006.01) |
| H01M 10/0525 | (2010.01) |
| H01M 4/62 | (2006.01) |
| H01M 10/0565 | (2010.01) |
| H01M 10/0569 | (2010.01) |
| H01M 10/0568 | (2010.01) |
| H01M 4/02 | (2006.01) |

(52) U.S. Cl.
CPC ......... *H01M 4/366* (2013.01); *H01M 4/0407* (2013.01); *H01M 4/623* (2013.01); *H01M 10/0525* (2013.01); *H01M 10/0565* (2013.01); *H01M 10/0568* (2013.01); *H01M 10/0569* (2013.01); *H01M 2004/021* (2013.01); *H01M 2300/0014* (2013.01); *H01M 2300/0082* (2013.01); *H01M 2300/0085* (2013.01)

(58) Field of Classification Search
None
See application file for complete search history.

(56) References Cited

U.S. PATENT DOCUMENTS 8,535,834 B1 * 9/2013 Yoon ...................... H01G 11/62
429/322

* cited by examiner

*Primary Examiner* — Sarah A. Slifka
(74) *Attorney, Agent, or Firm* — Sung T. Kim

(57) ABSTRACT

Electrodes including a passivation layer formed prior to receiving an initial charge are provided. The electrodes comprise an electrode-composition including an active electrode species, in which the electrode-composition comprises a first surface. The electrodes also comprise a passivation layer positioned onto at least a portion of the first surface. The passivation layer comprises: (i) a matrix material comprising (a) a cured propoxylated polymer, (b) an uncured hydrophobic glycol ether, or a combination of (a) and (b); and (ii) at least a first electrolyte. The electrodes may be included into an electrochemical cell.

19 Claims, 36 Drawing Sheets

ELECTRODES INCLUDING A PASSIVATION LAYER

CROSS-REFERENCE TO RELATED APPLICATIONS

This application claims priority under 35 U.S.C. § 119(e) to U.S. Provisional Patent Application Ser. No. 62/840,050, filed on Apr. 29, 2019, which is expressly incorporated by reference herein in its entirety.

STATEMENT REGARDING FEDERALLY SPONSORED RESEARCH OR DEVELOPMENT

This invention was made with Government support under Contract No. N00024-13-D-6400 awarded by the United States Department of the Navy. The Government has certain rights in the invention.

TECHNICAL FIELD

Embodiments of the invention relate generally to electrodes including a passivation layer formed thereon prior to receiving an initial charge, in which the electrodes may be combined with a variety of electrolyte compositions (e.g., liquid electrolytes, gel polymer electrolytes, deep eutectic solvents). The passivation layer may comprise a matrix material comprising: (a) a cured propoxylated polymer, (b) an uncured hydrophobic glycol ether, or a combination of (a) and (b). Embodiments of the invention also relate to electrochemical cells including one or more electrodes including a passivation layer formed thereon prior to receiving an initial charge.

BACKGROUND

The majority of today's rechargeable batteries are based on lithium-ion chemistry. While lithium-ion batteries possess the highest practical energy density and cycle life among rechargeable systems, they suffer from safety concerns. A prominent safety concern is related to the organic solvents utilized in such batteries. While these organic solvents can support a wide electrochemical window and enable high energy density, they are flammable and volatile. When combined with an oxygen rich cathode, they increase the potential for thermal runaway and catastrophic failure. As a result, batteries need to be thermally managed and hermetically packaged to ensure safety, which adds undesirable weight to the battery and limits lithium-ion battery architectures to rigid form factors (e.g., rigid casings, etc.). However, several commercial applications including autonomous systems, portable expeditionary power, and/or wearable/biomedical sensors require flexible, lightweight, and safe batteries that do not sacrifice energy density.

BRIEF SUMMARY

Certain embodiments of the invention provide an electrode comprising an electrode-composition including an active electrode species, in which the electrode-composition comprises a first surface, and a passivation layer positioned onto at least a portion of the first surface. In accordance with certain embodiments of the invention, the passivation layer may comprise: (i) a matrix material comprising (a) a cured propoxylated polymer, (b) an uncured hydrophobic glycol ether, or a combination of (a) and (b); and (ii) at least a first electrolyte.

In another aspect, embodiments of the present invention provide an electrochemical cell including an anode comprising an active anode species, a cathode comprising an active cathode species, and an electrolyte composition positioned between and in contact with the anode and the cathode. In accordance with certain embodiments of the invention, at least the anode includes a first passivation layer comprising a first matrix material and at least a first electrolyte distributed throughout the first matrix material. The first passivation layer may be positioned between the active anode species and the electrolyte composition. In accordance with certain embodiments of the invention, the first matrix material comprises: (a) a cured propoxylated polymer, (b) an uncured hydrophobic glycol ether, or a combination of (a) and (b).

In another aspect, embodiments of the present invention provide a method of forming an electrode. Such method, for instance, may include providing or forming an electrode-composition including an active electrode species, in which the electrode-composition comprises a first surface. The method may also include providing or forming a passivation-composition comprising a mixture of a matrix material and at least a first electrolyte in a liquid medium. The method may also include coating at least a portion of the first surface with the passivation-composition to provide a liquid-containing pre-passivation layer on at least a portion of the first surface. The method may also comprise at least one of drying or radically-curing the liquid-containing pre-passivation layer to form a passivation layer comprising the matrix material and the first electrolyte, in which the matrix material comprises: (a) a cured propoxylated polymer, (b) an uncured hydrophobic glycol ether, or a combination of (a) and (b).

In another aspect, embodiments of the present invention provide a method of forming an electrochemical cell. The method may include providing or forming an anode comprising a first passivation layer defining a first anode-surface, providing or forming a cathode, and positioning an electrolyte composition between and in contact with the first anode-surface and the cathode. In accordance with certain embodiments of the invention, the first passivation layer may comprise: (i) a matrix material comprising (a) a cured propoxylated polymer, (b) an uncured hydrophobic glycol ether, or a combination of (a) and (b); and (ii) at least a first electrolyte.

BRIEF DESCRIPTION OF THE DRAWINGS

Embodiments of the invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout, and wherein.

DETAILED DESCRIPTION

Figure 1:
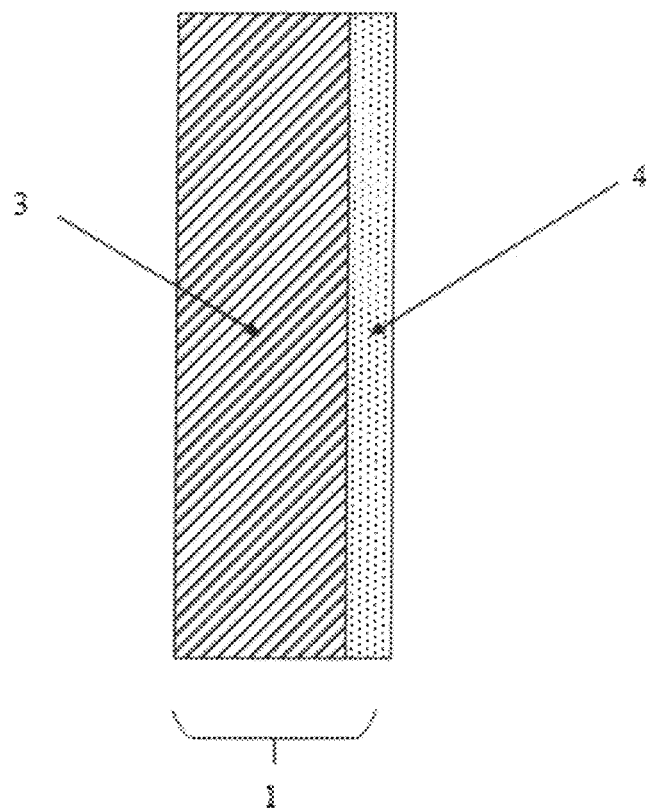
FIG. 1 illustrates an electrode including a passivation layer formed thereon in accordance with certain embodiments of the invention.

Embodiments of the invention now will be described more fully hereinafter with reference to the accompanying drawings, in which some, but not all embodiments of the invention are shown, indeed, the present invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

High performance, long-lived lithium ion batteries employing highly conductive aqueous electrolytes are a burgeoning technology, offering improved safety, and small form factors relative to existing lithium ion batteries that utilize combustible organic electrolytes. In order for electrochemical cells based on aqueous components to reach their full potential over the broadest electrochemical window, the suppression of the deleterious electrolysis of water that occurs at the electrodes should be pursued while simultaneously not overly limiting conductivity at the interface of the electrodes and electrolyte composition between the electrodes. Aqueous-based electrolyte systems suitable for use in a variety of electrochemical cells, for example, may significantly reduce or mitigate the risk of thermal runaways leading to undesirable fires and explosions. Aqueous-based electrolyte systems suitable for use in a variety of flexible (e.g., non-rigid) electrochemical cells may be flexed or bent on an as-needed basis during or prior to operation. Electrochemical cells including, for example, a gel polymer electrolyte (GPE) and/or a deep eutectic solvent (DES)-containing electrolyte composition may continue to function after severe trauma or abuse (e.g., puncturing, cutting) to the electrochemical cell without combustion of the electrolyte. In accordance with certain embodiments of the invention, electrochemical cells (e.g., aqueous electrochemical cells) including a cross-linked GPE suppress the electrochemical activity of water and subsequent decomposition gas generation at the anode and/or cathode, in this regard, however, some side reactions due to water activity/decomposition are still present particularly in initial cycles (e.g., initial charging and/or discharging). In accordance with certain embodiments of the invention, electrodes having a passivation layer formed thereon prior to receiving an initial charge are provided that further mitigate and/or reduce the undesirable water activity and/or decomposition at the anode and/or cathode. In this regard, the passivation layer inhibits or prevents water from migrating to the active electrode species during operation within an electrochemical cell. In accordance with certain embodiments of the invention, a combination of an aqueous-based liquid electrolyte, DBS, and/or GPE with one or more electrodes having a passivation layer significantly suppresses the electrochemical activity of water and further improves battery performance by increasing energy density and enhancing coulombic efficiency, which consequently improves cycle life and capacity retention.

Certain embodiments according to the invention provide an electrode comprising an electrode-composition including an active electrode species, in which the electrode-composition comprises a first surface, and a passivation layer positioned onto at least a portion of the first surface. The passivation layer inhibits or prevents water from migrating to the active electrode species during operation within an electrochemical cell. In accordance with certain embodiments of the invention, the passivation layer may comprise: (i) a matrix material comprising (a) a cured propoxylated polymer, (b) an uncured hydrophobic glycol ether, or a combination of (a) and (b); and (ii) at least a first electrolyte. In accordance with certain embodiments of the invention, the passivation layer may comprise less than 10% by weight, such as less than 5% by weight, or less than 1% by weight of water, an organic solvent, or both. In accordance with certain embodiments of the invention, the passivation layer may be devoid of water, an organic solvent, or both. In accordance with certain embodiments of the invention, the passivation layer may comprise a dry admixture (e.g., a solid-in-solid material) of the first electrolyte distributed throughout the matrix material (e.g., cured and/or cross-linked matrix material, uncured hydrophobic glycol ether, or a combination thereof). The first electrolyte, in accordance with certain embodiments of the invention, may be homogeneously distributed throughout the matrix material.

In accordance with certain embodiments of the invention, the matrix material of the passivation layer may consist completely of one or more cured propoxylated polymers. In accordance with certain embodiments of the invention, the matrix material of the passivation layer may consist completely of one or more uncured hydrophobic glycol ethers. In accordance with certain embodiments of the invention, the matrix material comprises a blend of one or more cured propoxylated polymers and one or more uncured hydrophobic glycol ethers. For example, the matrix material may comprise from about 1% to about 99% by weight of the one or more cured propoxylated polymers and front about 99% to about 1% by weight of the one or more uncured hydrophobic glycol ethers. In accordance with certain embodiments of the invention, the matrix material may comprise, on a dry basis, at least about 0.1% by weight of the one or more cured propoxylated polymers, such as at least about any of the following: 0.1, 0.5, 0.75, 1, 2, 3, 4, 5, 10, 15, 20, 25, 30, 35, 40, 45, 50, 55, 60, 65, 70, and 75% by weight of the one or more cured propoxylated polymers and/or at most about any of the following: MX), 100, 99, 95, 90, 85, 80, 75, 70, 65, and 60% by weight of the one or more cured propoxylated polymers. Additionally or alternatively, the matrix material may comprise, on a dry basis, at least about 0.1% by weight of the one or more uncured hydrophobic glycol ethers, such as at least about any of the following: 0.1, 0.5, 0.75, 1, 2, 3, 4, 5, 10, 15, 20, 25, 30, 35, 40, 45, 50, 55, 60, 65, 70, and 75% by weight of the uncured hydrophobic glycol ethers and/or at most about any of the following: 100, 99, 95, 90, 85, 80, 75, 70, 65, and 60% by weight of the one or more uncured hydrophobic glycol ethers.

In accordance with certain embodiments of the invention, the first electrolyte may comprise from about 1% to about 40% by weight of the passivation layer on a dry basis, such as at most about any of the following: 40, 35, 30, 28, 25, 22, 20, 15, 12, 10, and 5% by weight of the passivation layer on a dry basis and/or at least about any of the following: 1, 2, 3, 5, 8, 10, 12, 15, and 20% by weight of the passivation layer on a dry basis. In accordance with certain embodiments of the invention, the matrix material comprises from about 50% to about 99% by weight of the passivation layer on a dry basis, such as at most about any of the following: 99, 95, 90, 85, 80, 75, and 70% by weight of the passivation layer on a dry basis and/or at least about any of the following: 50, 55, 60, 65, 70, and 75% by weight of the passivation layer on a dry basis.

In accordance with certain embodiments of the invention, the active electrode species in the electrode-composition may comprise an active anode species or an active cathode species. The electrode-composition may also include one or more binders admixed with the active electrode species. For example, the electrode-composition may include a variety of binders suitable for use in electrode formation, such as poly(acrylic acid) (PAA) and copolymers thereof, styrene-butadiene rubber (SBR), and polyvinylidene fluoride (PVDF) based binders. Additionally or alternatively, a GPE-composition suitable for formation of an aqueous-based GPE may also be used as a binder component within the electrode-composition.

In accordance with certain embodiments of the invention, the passivation layer may comprise a second surface, a third surface, and a thickness, in which the second surface is adjacent or proximate to the first surface of the electrode-composition and the third surface is distal to the first surface of the electrode-composition. In accordance with certain embodiments of the invention, the second surface of the passivation layer may penetrate into the electrode-composition. In this regard, an interface between the first surface of the electrode-composition and the second surface of the passivation layer may be non-smooth due to the penetration of a portion of the passivation layer into pores of the electrode-composition, which provides a greater surface area of contact between the passivation layer and the electrode-composition. In accordance with certain embodiments of the invention, the thickness of the passivation layer may be defined by a shortest distance between the second surface of the passivation layer and the third surface of tire passivation layer. The thickness of the passivation layer, for instance, is particularly thin to minimize electrical impedance. In accordance with certain embodiments of the invention, the thickness of the passivation layer may comprise from about 0.05 to about 100 microns or from about 0.05 to about 50 microns, such as at most about any of the following: 100, 90, 80, 70, 60, 50, 40, 30, 20, 15, 10, 9, 8, 7, 6, 5, 4, 3, 2, and 1 microns and/or at least about any of the following: 0.05, 0.7, 0.9, 1, 2, 3, 4, 5, 10, and 20 microns.

Figure 2:
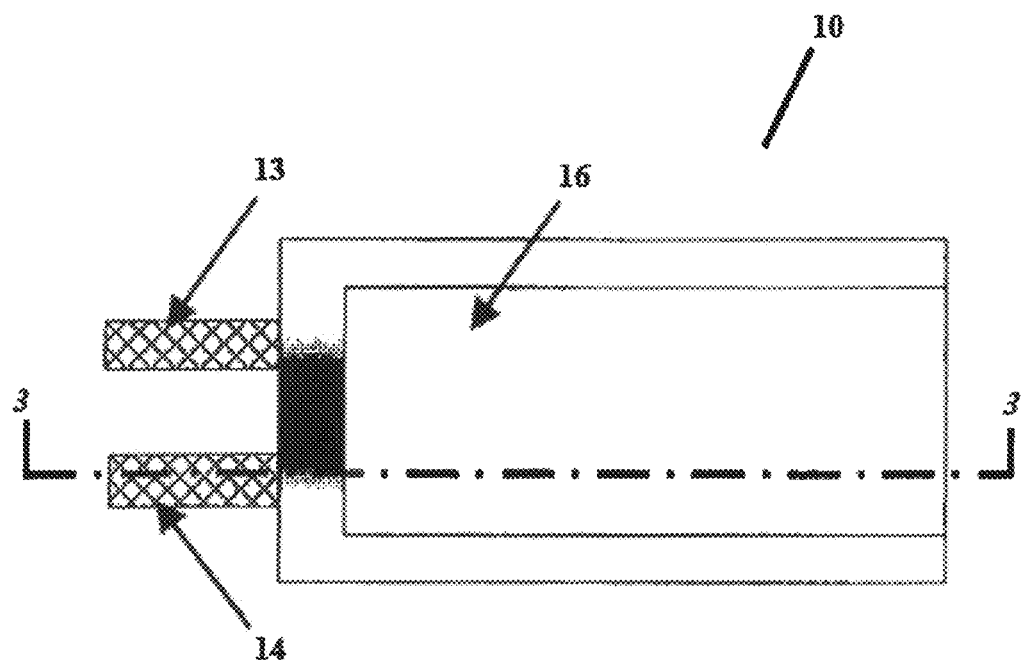
FIG. 2 illustrates an electrochemical cell according to certain embodiments of the invention.
Figure 3:
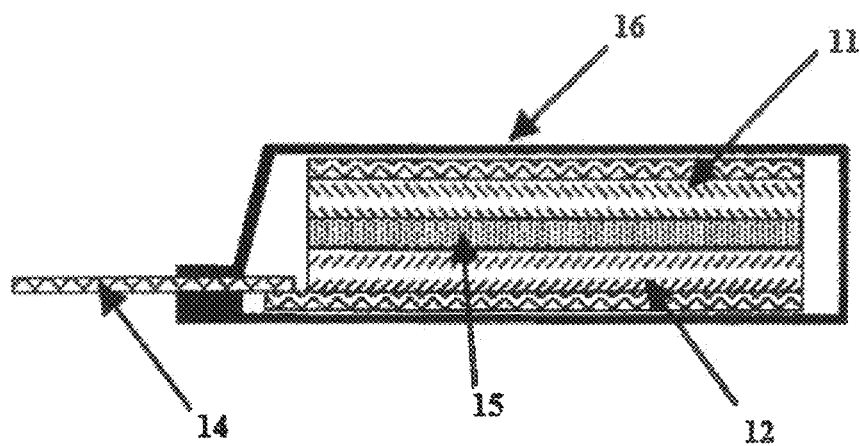
FIG. 3 illustrates a cross-sectional view of the electrochemical cell of FIG. 2.

FIG. 1, for example, illustrates an electrode including a passivation layer formed thereon in accordance with certain embodiments of the invention. In particular, FIG. 1 illustrates electrode 1 including an electrode-composition 3 and a passivation layer 4 in contact with the electrode-composition 3. As illustrated in FIG. 1, the passivation layer may overlie and be in direct contact with the electrode-composition 3. As noted previously, electrodes having a passivation layer formed thereon prior to an initial charging may be incorporated into a variety of electrochemical cells (e.g., aqueous-based electrochemical cells). FIG. 2, for example, illustrates an exterior of an electrochemical cell 10 according to certain embodiments of rite invention. As shown in FIG. 2, the electrochemical cell 10 may comprise battery container or housing 16, a cathode lead terminal 13 and an anode lead terminal 14. FIG. 3 illustrates a cross-sectional view of the electrochemical cell 10 of FIG. 2. As shown in FIG. 3, the electrochemical cell 10 comprises a cathode 11, an anode 12, and an electrolyte composition (e.g., GPE. DBS) 15 that is disposed between and in contact with the cathode 11 and anode 12.

Although not illustrated in FIGS. 1-3, the passivation layer may comprise a dry admixture (e.g., a solid-in-solid material) of a first electrolyte distributed throughout the matrix material. The first electrolyte, in accordance with certain embodiments of the invention, may be homogeneously distributed throughout the matrix material. In accordance with certain embodiments of the invention, the first electrolyte may comprise a salt, such as a salt selected from a lithium salt or a zinc salt, or combination thereof. In accordance with certain embodiments of the invention, the first electrolyte may include a compound capable of generating an ion upon being dissolved in a solvent (e.g., an aqueous solvent) including lithium salts such as lithium bis(oxalate)borate (LiBOB), LiFAP, [LiPF$_3$(CF$_2$CF$_3$)$_3$], lithium difluoro(oxalate)borate (LiDFOB), lithium methoxide (CH$_3$OLi), lithium hexafluorophosphate (LiPF$_6$), lithium tetrafluoroborate (LiBF$_4$), lithium hexafluoroarsenate (LiAsF$_6$), lithium perchlorate (LiClO$_4$), lithium trifluoromethanesulfonate (CF$_3$SO$_3$Li), lithium bis(trifluoromethanesulfonylimide (LiN(SO$_2$CF$_3$)$_2$), lithium bis(perfluoroethanesulfonyl)imide (LiN(SO$_2$C$_2$F$_5$)$_2$), tris(trifluoromethanesulfonyl)methyllithium (LiC(SO$_2$CF$_3$)$_3$), tris(perfluoroethanesulfonyl)methyllithium (LiC(SO$_2$C$_2$F$_5$)$_3$), lithium tetrachloroaluminate (LiAlCl$_4$), lithium hexafluorosilicate (Li$_2$SiF$_6$), and lithium dicyanamide (LiC$_2$N$_3$). Additionally or alternatively to lithium salts, the first electrolyte may be selected from sodium salts, magnesium salts, zinc salts, and calcium salts. In accordance with certain embodiments of the invention, the first electrolyte may comprise lithium bis(trifluoromethanesulfonyl)imide (LiTFSI), lithium trifluoromethanesulfonate (LiOTf), lithium chloride (LiCl), lithium perchlorate (LiClO$_4$) lithium bromide (LiBr), lithium iodide (LiI), lithium thiocyanate (LiSCN), lithium tetrafluoroborate (LiBF$_4$), lithium hexafluoroarsenate (LiAsF$_6$), lithium bis(oxalate)borate (LiBOB), lithium hexafluorophosphate (LiPF$_6$), a lithium polysulfide, zinc trifluoromethanesulfonate (Zn(OTf)$_2$), di[bis(trifluoromethanesulfonyl)imide] (Zn(TFSI)$_2$), lithium difluoro(oxalate)borate (LiDFOB), lithium methoxide (CH$_3$OLi), or combinations thereof.

In accordance with certain embodiments of the invention, the matrix material of the passivation layer may comprise: (a) a cured propoxylated polymer, (b) an uncured hydrophobic glycol ether, or a combination of (a) and (b) as noted above, in accordance with certain embodiments of the invention, the matrix material may comprise one or more cured propoxylated polymers. In accordance with certain embodiments of the invention, the one more cured propoxylated polymers may comprise a polymerized hydrophobic ether. In accordance with certain embodiments of the invention, the polymerized hydrophobic ether may comprise at least one polypropylene glycol) (PPG) based monomeric constituent. By way of example only, the polymerized hydrophobic ether may comprise one or more of the following monomeric constituents: poly(propylene glycol) acrylate, poly(propylene glycol) methacrylate, poly(propylene glycol) diacrylate, poly(propylene glycol) dimethacrylate, and trimethylolpropane propoxylate triacrylate, glycerol propoxylate triacrylate, glycerol propoxylate trimethacrylate, bisphenol A propoxylate diacrylate, bisphenol A propoxylate dimethacrylate, pentaerythritol propoxylate diacrylate, pentaerythritol propoxylate tertraacrylate, neopentylglycol propoxylate diacrylate, neopentyl glycol propoxylate diacrylate, glycerol ethoxylate-co-propoxylate diacrylate, glycerol ethoxylate-co-propoxylate dimethacrylate, propylene glycol diacrylate, propylene glycol dimethacrylate, ethylenediamine tetrakis(ethoxylate-block-propoxylate) tetraacrylate, ethylenediamine tetrakis(ethoxylate-block-propoxylate) tetramethacrylate, tri(propylene glycol) diacrylate, tri(propylene glycol) dimethacrylate, or any combinations thereof.

In accordance with certain embodiments of the invention, the polymerized hydrophobic ether comprises a solubility in water of less than about 20% by weight at 25° C., such as at most about any of the following: 20, 18, 16, 15, 14, 12, 10, and 8% by weight at 25° C. and/or at least about any of the following: 0, 0.1, 0.5, 1, 2, 3, 4, 5, 6, 7, 8, 9, and 10% by weight at 25° C.

In accordance with certain embodiments of the invention, the cured propoxylated polymer may consist completely of PPG-based monomeric constituents. In accordance with certain embodiments of the invention, the cured propoxylated polymer may comprise both one or more PPG-based monomeric constituents and at least one non-PPG monomeric constituent, wherein the matrix material comprises from about 1% to about 10% by weight of the matrix material of the at least one non-PPG monomeric constituent, such as at most about any of the following: 10, 9, 8, 7, 6, 5, 4, 3, 2, and 1% by weight of the matrix material and/or at least about any of the following: 1, 2, 3, 4, and 5% by weight of the matrix material, in accordance with certain embodiments of the invention, the at least one non-PPG monomeric constituent is hydrophobic. For example, the at least one non-PPG monomeric, constituent may comprise at least one fluorinated monomer.

In accordance with certain embodiments of the invention, the at least one fluorinated monomer may comprise from about 2 to about 40 carbon atoms, such as at most about any of the following: 40, 35, 30, 25, 20, 18, 16, 14, 12, find 10 carbon atoms and/or at least about any of the following: 2, 3, 4, 5, 6, 8, 10, 12, 14, and 16 carbon atoms. The at least one fluorinated monomer may also comprise from about 2 to about 40 fluorine atoms, such as at most about any of the following: 40, 35, 30, 25, 20, 18, 16, 14, 12, and 10 fluorine atoms and/or at least about any of the following: 2, 3, 4, 5, 6, 8, 10, 12, 14, and 16 fluorine atoms. The at least one fluorinated monomer, in accordance with certain embodiments of the invention, may comprise at least one free-radically polymerizable functional groups, such as an (meth)acrylate functional, methacrylate, acrylamide, styrene, vinyl ester, vinyl amide, or vinyl ether functional groups. Non-limiting examples of the at least one fluorinated monomer suitable for certain embodiments of the invention include 2, 3, 4, 5, 6-Pentafluorostyrene (PFS), Pentafluorophenyl acrylate (PFPA), 1H, 1H, 2H, 2H-Heptadecafluorodecyl acrylate (C10F17-A), 1H, 1H, 2H, 2H-Tridecafluorodecyl acrylate (C10F13-A), 1H, 1H, 5H-Octafluoropentyl acrylate (C5F8-A), 1H, 1H-Heptafluoropentyl acrylate (C5F7-A), 1,1,1,3, 3,3,-Hexafluoroisopropyl acrylate (C3F6-A), 2,2,2-Trifluoroethyl acrylate (C2F3-A), and any combinations thereof.

In accordance with certain embodiments of the invention, the at least one fluorinated monomer may comprise from about 1-30 wt. % of the total amount of monomers forming the matrix material, such as from at most about any of the following: 30, 28, 26, 24, 22, 20, 18, 16, 14, 12, 10, and 8 wt. % of the total amount of monomers forming the matrix material and/or at least about any of the following: 1, 2, 3, 4, 5, 6, 7, 8, 9, and 10 wt. % of the total amount of monomers forming the matrix material.

Additionally or alternatively, the at least one non-PPG monomeric constituent may comprise a polyfunctional crosslinking monomer including at least two free-radically polymerizable functional groups, such as an aliphatic monomer having from about 6 to about 40 carbon atoms, such as at most about any of the following: 40, 35, 30, 25, 20, 18, 16, 14, 12, and 10 carbon atoms and/or at least about any of the following: 6, 8, 10, 12, 14, and 16 carbon atoms; and wherein the at least two free-radically polymerizable functional groups may be independently selected from, for example, an acrylate functional group, a (meth)acrylate functional groups, a styrenic functional group, an acrylamide functional group, a vinyl amide functional group, a vinyl ester functional group, and a vinyl ester functional group.

In accordance with certain embodiments of the invention, the polyfunctional crosslinking monomer comprises Bisphenol A dimethacrylate, Diurethane dimethacrylate (DUDMA), 1,12-dodecandiol dimethacrylate (C12-DMA), 1,10-bis(acryloyloxy)decane (C10-DA), 1,9-bis(acryloyloxy)nonane (C9-DA), 1-6-bis(acryloyloxy)hexane (C6-DA); Polycaprolactone trimethacrylate (PCLTMA), Tris-(4-hydroxyphenyl)ethane trimethacrylate, poly(propylene glycol) diacrylate, polypropylene glycol) dimethacrylate, and trimethylolpropane propoxylate triacrylate, glycerol propoxylate triacrylate, glycerol propoxylate trimethacrylate, bisphenol A propoxylate diacrylate, bisphenol A propoxylate dimethacrylate, pentaerythritol propoxylate diacrylate, pentaerythritol propoxylate tertraacrylate, neopentylglycol propoxylate diacrylate, neopentyl glycol propoxylate diacrylate, glycerol ethoxylate-co-propoxylate diacrylate, glycerol ethoxylate-co-propoxylate dimethacrylate, propylene glycol diacrylate, propylene glycol dimethacrylate, ethylenediamine tetrakis(ethoxylate-block-propoxylate) tetraacrylate, ethylenediamine tetrakis (ethoxylate-block-propoxylate) tetramethacrylate, tri (propylene glycol) diacrylate, tri(propylene glycol) dimethacrylate, or combinations thereof.

In accordance with certain embodiments of the invention, the at least one non-PPG monomeric constituent may comprise a long chain monofunctional monomer comprising horn about 6 to about 40 carbon atoms, such as at most about any of the following: 40, 35, 30, 25, 20, 18, 16, 14, 12, and 10 carbon atoms and/or at least about any of the following: 6, 8, 10, 12, 14, and 16 carbon atoms. The long chain monofunctional monomer, for example, comprises at least one free-radically polymerizable functional group, such as an acrylate, methacrylate, acrylamide, styrene, vinyl ester, vinyl amide, or vinyl ether functional group. Non-limiting examples of a long chain monofunctional monomer suitable for certain embodiments of the invention include the following: Isobornyl acrylate (IBA), Lauryl methacrylate (LMA), Stearyl methacrylate (SMA), Cyclohexyl methacrylate (CyMA), 2-Ethylhexyl acrylate (2-EHA), and Isodecyl acrylate (IDA).

In accordance with certain embodiments of the invention, the matrix material may comprise from 0.5% to about 5% by weight of the non-PPG monomeric constituent, such as at most about any of the following: 5, 4, 3, 2, and 1% by weight of the non-PPG monomeric constituent and and/or at least about any of the following: 0.1, 0.5, 0.75, 1, and 2% by weight of the non-PPG.

In accordance with certain embodiments of the invention, the matrix material of the passivation layer may comprise: (a) a cured propoxylated polymer, (b) an uncured hydrophobic glycol ether, or a combination of (a) and (b) as noted above. In accordance with certain embodiments of the invention, the matrix material may comprise one or more uncured hydrophobic glycol ether. In accordance with certain embodiments of the invention, the uncured hydrophobic glycol ether may comprise, for example, polypropylene glycol), tri(propylene glycol) butyl ether, propylene glycol phenyl ether, dipropylene glycol phenyl ether, dipropylene glycol n-butyl ether, propylene glycol n-butyl ether, propylene glycol methyl ether acetate, propylene glycol propyl ether, propylene glycol diacetate, propylene glycol dicaprate, propylene glycol monolaurate, 1,2-propylene glycol diacetate, propylene glycol dilaurate, di(propylene glycol) dibenzoate, tri(propylene glycol) diacetate, di(propylene glycol) butyl ether, di(propylene glycol) propyl ether, poly(propylene glycol)-block-poly(ethylene glycol)-block-poly(propylene glycol), di(propylene glycol) dimethyl ether, tri(propylene glycol) methyl ether, di(propylene glycol) methyl ether acetate, di(propylene glycol) phenyl ether, or any combinations thereof.

In accordance with certain embodiments of the invention, the uncured hydrophobic glycol ether comprises a solubility in water of less than about 20% by weight at 25° C., such as at most about any of the following: 20, 18, 16, 15, 14, 12, 10, and 8% by weight at 25° C. and/or at least about any of the following: 0, 0.1, 0.5, 1, 2, 3, 4, 5, 6, 7, 8, 9, and 10% by weight at 25° C.

In accordance with certain embodiments of the invention, due to the incorporation of the first electrolyte (e.g., a lithium salt) within a matrix of the dry polymeric material (e.g., no water and/or volatile organic solvent is present), the electrode-active species utilization is significantly enhanced, improving the practically achievable energy density. Additionally, using this approach in accordance with certain embodiments of the invention, side reactions that are typically observed in the first cycle and are attributed to water decomposition are suppressed and the coulombic efficiency approaches 100%. In accordance with certain embodiments of the invention, the passivation layer may be devoid of water, an organic solvent (e.g. a volatile organic solvent), or both.

Figure 4A:
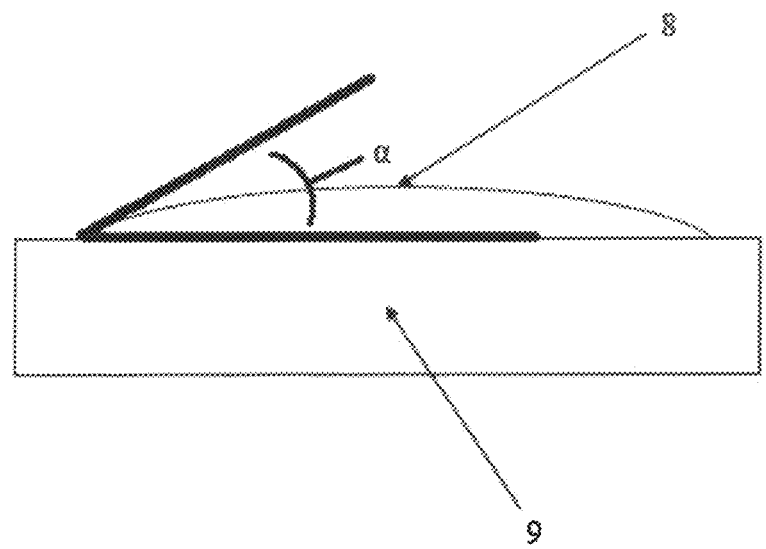
FIG. 4A illustrates a typical water contact angle for a hydrophilic substrate.
Figure 4B:
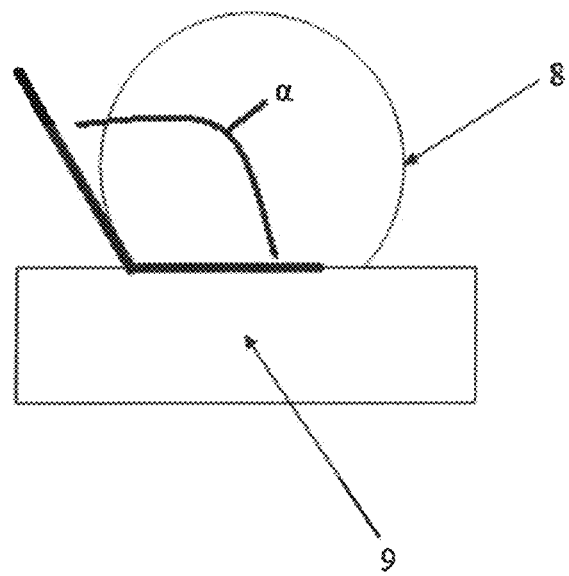
FIG. 4B illustrates a typical water contact angle for a hydrophobic substrate.

In accordance with certain embodiments of the invention, the passivation layer comprises a hydrophobic surface that may be exposed or in contact with an aqueous-based electrolyte (e.g., aqueous-based GPE). FIG. 4A illustrates a water contact angle 'α' for a typical hydrophilic substrate, in which the liquid droplet 8 (e.g., water) spreads out across the substrate 9 and forms, for example, a water contact angle 'α' below 90°. For comparison. FIG. 4B illustrates a water contact angle 'α' for a typical hydrophobic substrate, in which the liquid droplet 8 (e.g., water) forms a bead on the substrate 9 and forms, for example, a water contact angle 'α' above 90°.

In accordance with certain embodiments of the invention, the matrix material comprises a hydrophobic polymer or polymers (e.g., cured, uncured, or a combination thereof), which may be conductive to facilitate charge and ion migration across the passivation layer. In accordance with certain embodiments of the invention, the hydrophobic polymer comprises a cross-linked polymer (e.g., cured) formed from one or more monomers (e.g., one or more hydrophobic monomers). In accordance with certain embodiments of the invention, the cured propoxylated polymer and/or uncured hydrophobic glycol ether comprise a hydrophobic polymer. As noted above, the cured propoxylated polymer may comprise one or more non-PPG based monomeric constituents, such as a fluorinated monomer. In accordance with certain embodiments of the invention, the matrix material comprises a hydrophobic polymer and the resulting passivation layer may be devoid of fluorine atoms. In accordance with certain embodiments of the invention, the passivation layer may be devoid of water, an organic solvent (e.g., a volatile organic solvent), or both.

In accordance with certain embodiments of the invention, the matrix material comprising the combination of monomers may also comprise a free radical initiator (e.g., chemical initiator, thermal initiator, photo-initiator, or redox initiation system), in which the free radical initiator may be present from about 0.1 to about 10 wt. % of the total monomer mass in the composition prior to being radically-cured. In accordance with certain embodiments of the invention, the free radical initiator may be present from at most about any of the following: 10, 9, 8, 7, 6, 5, 4, 3, 2, and 1 wt. % of the total monomer mass in the composition prior to being radically-cured and/or at least about any of the following: 0.1, 0.25, 0.5, 0.75, 1, 1.25, 1.5, 1.75, 2, 2.25, and 2.5 wt. % of the total monomer mass in the composition prior to being radically-cured.

In accordance with certain embodiments of the invention, the matrix material may comprise a minor amount of a solvent that was used as a carrier for the matrix material to facilitate penetration of the matrix material into the pores of the electrode-composition. In accordance with certain embodiments of the invention, the solvent may comprise a fluorinated solvent. In accordance with certain embodiments of the invention, the solvent may comprise at most, about 10% by wt. of the matrix material, such as at most about any of the following: 10, 8, 6, 4, 2, 1, 0.75, 0.5, 0.1, or 0.05% by wt. of the matrix material.

Passivation layers in accordance with certain embodiments of the invention may be formed from a matrix material or materials that comprise or consist of a hydrophobic polymer(s) (e.g., termed by a reaction product of monomers discussed above) and define a relatively hydrophobic surface that may be exposed or adjacent to an aqueous electrolyte (e.g., an aqueous GPE). In accordance with certain embodiments of the invention, the polymeric material or materials may be hydrophobic and provide water contact angles V (for the matrix material itself without the addition of salt-based electrolytes) from about 85 to about 120 degrees, such as about any of the following: 120, 115, 112, 110, 109, 108, 107, 106, 105, 104, 103, 102, 101, 100, 98, 96, 94, 92, and 90 degrees and/or at least about any of the following: 85, 86, 87, 88, 90, 92, 94, 96, 98, and 100 degrees. Static water contact angles can be measured using a Ramé-Hart Instruments goniometer as is known in the art.

In accordance with certain embodiments of the invention, the passivation layer has a conductivity of at least $1\times10^{-7}$ to $1\times10^{-4}$ S/cm, such as from $1\times10^{-3}$ to $1\times10^{-5}$.

In accordance with certain embodiments of the invention, the electrode has not received an initial charge.

In another aspect, embodiments of the present invention provide electrochemical cells (e.g., aqueous-based electrochemical cell) including an anode comprising an active anode species, a cathode comprising an active cathode species, and an electrolyte composition positioned between and in contact with the anode and the cathode. In accordance with certain embodiments of the invention, at least the anode includes a first passivation layer comprising a first matrix material and at least a first electrolyte distributed throughout the first matrix material. The first passivation layer may be positioned between the active anode species and the electrolyte composition. In accordance with certain embodiments of the invention, the first matrix material comprises: (a) a cured propoxylated polymer, (b) an uncured hydrophobic glycol ether, or a combination of (a) and (b). In accordance with certain embodiments of the invention, the cathode may comprise the positive electrode and the anode may comprise the negative electrode, in which the cathode refers to the electrode where the reduction takes place during discharge and the anode refers to the electrode where oxidation takes place during discharge.

As used herein, the term "active anode species" may comprise any electrochemically active species associated with the anode. For example, the anode may comprise graphite, lithium, zinc, silicon, tin oxides, antimony oxides, or a lithium-containing material, such as lithium titanium oxide. In accordance with certain embodiments of the invention, the anode active species may comprise lithium metal or a lithium alloy. As used herein, the term "active cathode species" may comprise any electrochemically active species associated with the cathode. For example, the cathode may comprise a lithium metal oxide (e.g., a lithium-doped cobalt oxide, lithium-doped titanium oxide, lithium-doped nickel oxide, a lithium-doped manganese oxide), or a sulfur-containing material (e.g., elemental sulfur).

In accordance with certain embodiments of the invention, at least the anode includes a first passivation layer comprising a first matrix material and at least a first electrolyte (e.g., a lithium salt) distributed throughout the first matrix material. The first passivation layer, in accordance with certain embodiments of the invention, may be positioned between the active anode species and the electrolyte composition (e.g., an aqueous-based GPE). In accordance with certain embodiments of the invention, the cathode of the electrochemical cell may also include a passivation layer. For example, the anode may comprise the first passivation layer and the cathode may include a second passivation layer comprising a second matrix material and at least a second electrolyte distributed throughout the second matrix material. The second passivation layer may be positioned between the active cathode species and the electrolyte composition (e.g., an aqueous GPE). In accordance with certain embodiments of the invention, the electrolyte composition may comprise: (i) a GPE having a cross-linked three-dimensional polymer network, an electrolyte absorbed by the GPE, and water, or (ii) a GPE having a cross-linked three-dimensional polymer network, and a DES, or (iii) a DBS; or (iv) a GPE having a cross-linked three-dimensional polymer network, a DES, and water.

In accordance with certain embodiments of the invention, the electrochemical cells may be provided in a variety of different shapes and forms and may comprise primary and secondary electrochemical cells. For instance, electrochemical cells in accordance with certain embodiments of the invention may comprise a rigid or non-rigid configuration. Non-rigid configurations, for example, may comprise an electrochemical cell that may be flexible such that the electrochemical cell's shape or configuration may be adjustable (e.g., movable between linear/flat configuration to an arcuate configuration) prior to or during operation. In accordance with certain embodiments of the invention, the electrochemical cells (e.g., aqueous electrochemical cells) may include one or more electrodes (e.g., anode and/or cathode) including a passivation layer as described herein.

In accordance with certain embodiments of the invention, the electrolyte composition may comprise an aqueous-based electrolyte composition including less than 10% by weight, such as less than 5% by weight, or less than 1% by weight of an organic solvent. In accordance with certain embodiments of the invention, the aqueous-based electrolyte composition may be devoid of an organic solvent.

In accordance with certain embodiments of the invention, the electrolyte may comprise a salt, such as a salt selected from a lithium salt or a zinc salt, or combination thereof. In accordance with certain embodiments of the invention, the electrolyte may include a compound capable of generating an ion upon being dissolved in a solvent (e.g., an aqueous solvent) including lithium salts such as lithium bis(trifluoromethanesulfonyl)imide (LiTFSI), lithium trifluoromethanesulfonate (LiOTf), lithium chloride (LiCl), lithium hexafluorophosphate (LiPF$_6$), a lithium polysulfide, lithium perchlorate (LiClO$_4$), lithium bromide (LiBr), lithium iodide (LiI), lithium thiocyanate (LiSCN), lithium tetrafluoroborate (LiBF$_4$), lithium hexafluoroarsenate (LiAsF$_6$), lithium bis(oxalate)borate (LiBOB), LiFAP [LiPF$_3$(CF$_2$CF$_3$)$_3$], or combinations thereof. Additionally or alternatively to lithium salts, the electrolyte may be selected from sodium salts, magnesium salts, zinc salts, and calcium salts. In accordance with certain embodiments of the invention, the electrolyte may comprise lithium bis(trifluoromethanesulfonyl)imide (LiTFSI), lithium trifluoromethanesulfonate (LiOTf), lithium chloride (LiCl), lithium perchlorate (LiClO4), lithium bromide (LiBr), lithium iodide (LiI), lithium thiocyanate (LiSCN), lithium tetrafluoroborate (LiBF$_4$), lithium hexafluoroarsenate (LiAsF6), lithium bis(oxalate)borate (LiBOB), lithium difluoro(oxalate)borate (LiDFOB), lithium hexafluorophosphate (LiPF6), a lithium polysulfide, zinc trifluoromethanesulfonate (Zn(OTf)2), di(bis(trifluoromethanesulfonyl)imide) (Zn(TFSI)2), or combinations thereof.

In accordance with certain embodiments of the invention, the electrochemical cell has not received an initial charge and/or discharge.

In accordance with certain embodiments of the invention, the electrochemical cells may comprise an operational voltage window from about 1 to about 5 volts, such as at most about any of the following: 5, 4.5, 4, 3.5, 3, and 2.5 volts and/or at least about any of the following: 1, 1.25, 1.5, 1.75, 2, 2.25, 2.5, 2.75, 3, 3.25, 3.5, 3.75, and 4 volts.

In accordance with certain embodiments of the invention, the electrochemical cells comprise a particularly improved energy density per unit mass of the electrochemical cell. In one aspect, the aqueous electrochemical ceils disclosed herein do not need significant housing requirements and other added safety components used to mitigate thermal runaways associated with organic-based electrochemical cells. The reduced weight especially coupled with the added safety associated with an aqueous electrochemical cell, may be particularly desirable in any application in which weight reduction is of importance, such as in automobiles, aircraft, aerospace applications, military equipment, and hiking equipment to name a few. In accordance with certain embodiments of the invention, the electrochemical cells may comprise energy density per unit mass of the electrochemical cell from about 0.2 to about 0.8 MS/Kg, such as at most about any of the following: 0.8, 0.7, 0.6, 0.5, 0.4, 0.3, 0.275, 0.25, and 0.225 MJ/Kg and/or at least about any of the following: 0.2, 0.225, 0.25, 0.275, 0.3, 0.35, and 0.4 MJ/Kg.

Figure 5:
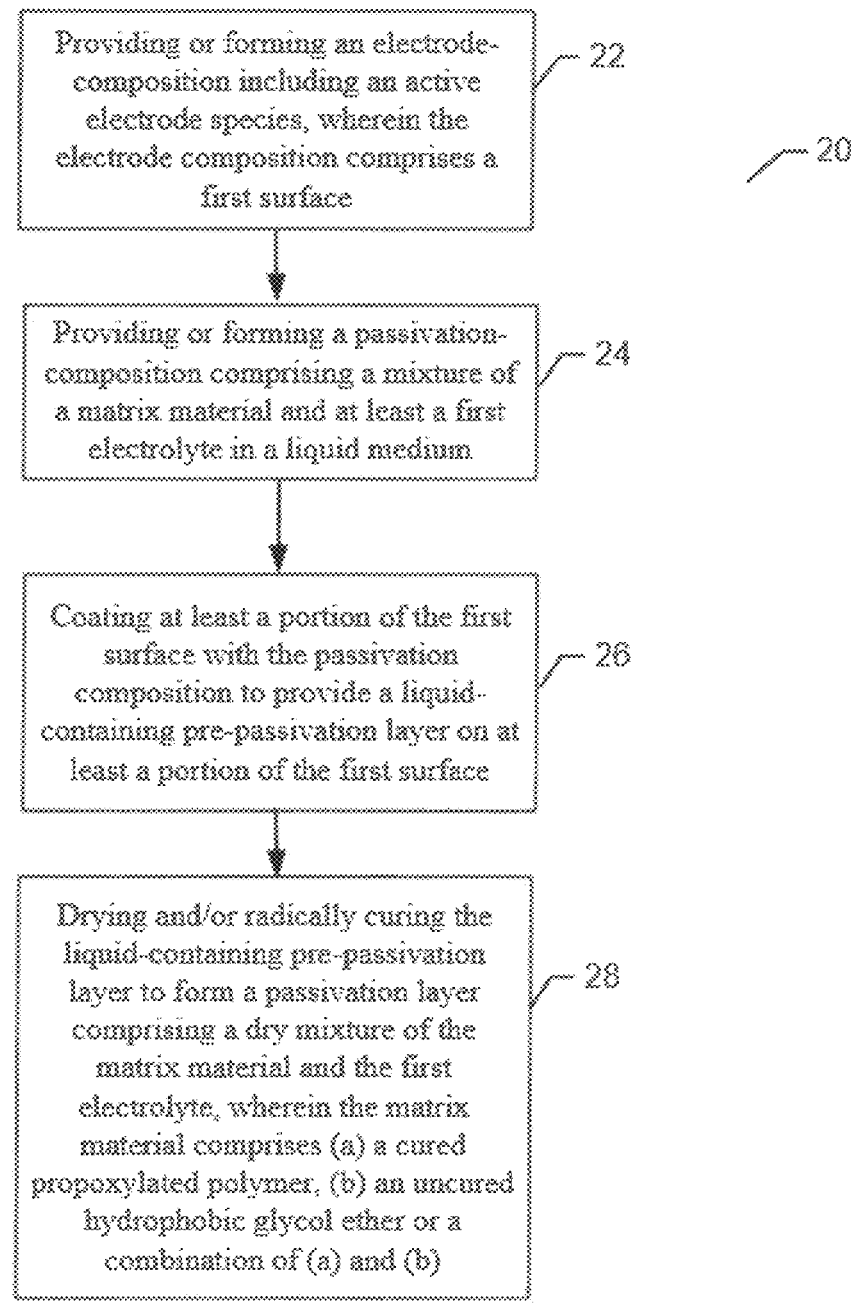
FIG. 5 illustrates a flow diagram of a method for forming an electrode in accordance with certain embodiments of the invention.

In another aspect, embodiments of the present invention provide a method of forming an electrode. FIG. 5, for example, illustrates a method 20 for forming an electrode that may include providing or forming an electrode-composition including an active electrode species, in which the electrode-composition comprises a first surface at operation 22. The method of forming an electrode may also include providing or forming a passivation-composition comprising a mixture of a matrix material and at least a first electrolyte (e.g., a lithium salt) in a liquid medium (e.g., as a solution, slurry, or suspension) at operation 24. In accordance with, certain embodiments of the invention, the method may include coating at least a portion of the first surface with the passivation-composition to provide a liquid-containing pre-passivation layer on at least a portion of the first surface at operation 26. The method may also comprise drying and/or radically curing the liquid-containing pre-passivation layer to form a passivation layer comprising a dry mixture of the matrix material and the first electrolyte, in which the Matrix material comprises: (a) a cured propoxylated polymer, (b) an uncured hydrophobic glycol ether, or a combination of (a) and (b) at operation 28.

In accordance with certain embodiments of the invention, drying the liquid-containing pre-passivation layer may comprise subjecting this layer to conditions sufficient to ensure the passivation layer comprises less than 10% by weight, such as less than 5% by weight, or less than 1% by weight of water, an organic solvent (e.g., a volatile organic solvent), or both. In accordance with certain embodiments of the invention, the passivation layer may be devoid of water, an organic solvent (e.g., a volatile organic solvent), or both.

In accordance with certain embodiments of the invention, the liquid medium in the operation of providing or forming a passivation-composition may comprise an organic solvent. In this regard, the liquid-containing pre-passivation layer may comprise at least a first portion of the organic solvent and a second portion of the organic solvent along with a matrix material-portion that penetrates into a plurality of pores of the electrode-composition. As noted above, the organic solvent may comprise a fluorinated solvent as described and disclosed herein.

In accordance with certain embodiments of the invention, the operation of drying the liquid-containing pre-passivation layer may comprise actively or passively evaporating the solvent (e.g., aqueous or organic solvent) after the second portion of the solvent (e.g., aqueous or organic solvent) along with the matrix material-portion penetrates into the plurality of pores of the electrode-composition.

In accordance with certain embodiments of the invention, the operation of drying the liquid-containing pre-passivation layer may comprise subjecting the liquid-containing pre-passivation layer, for example, in an oven (e.g., either alone or already coated onto an electrode-composition of an electrode) for a sufficient period of time (e.g., 24 hours or more) to remove most or all of the solvent (e.g., aqueous or volatile organic solvent) to provide a dry admixture of the matrix material and the first electrolyte as described herein. In accordance with certain embodiments of the invention, the resulting dry mixture (e.g., a solid-in-solid material) may then be coated onto an electrode-composition (e.g., active electrode material alone or in combination with a binder) to provide an electrode including a passivation layer thereon.

In accordance with certain embodiments of the invention, the operation of providing or forming a passivation-composition comprising a mixture of a matrix material, such as the monomeric constituents described above, and at least a first electrolyte in a liquid medium (e.g., as a solution, slurry, or suspension) may comprise admixing two or more of the monomeric constituents described above. In accordance with certain embodiments of the invention, for instance, the admixture and the resulting passivation layer may be devoid of fluorine atoms. In accordance with certain embodiments of the invention, the admixture may also include a free radical initiator (e.g., chemical initiator, thermal initiator, photo-initiator, or redox initiation system), in which the free radical initiator may be present from about 0.1 to about 10 wt. % of the total monomer mass in the composition prior to being radically-cured (if the passivation includes a cured propoxylated polymer). In accordance with certain embodiments of the invention, the free radical initiator may be present from at most about any of the following: 10, 9, 8, 7, 6, 5, 4, 3, 2, and 1 wt. % of the total monomer mass in the composition prior to being radically-cured and/or at least about any of the following: 0.1, 0.25, 0.5, 0.75, 1, 1.25, 1.5, 135, 2, 2.25, and 2.5 wt. % of the total monomer mass in the composition prior to being radically-cured. In accordance with certain embodiments of the invention the admixture of the monomeric constituents, the first electrolyte, and the free radical initiator may be applied directly onto an electrode-composition (e.g., active electrode material alone or in combination with a binder) to provide an electrode including a liquid-containing passivation-composition that is ready for (i) cross-j inking and/or curing, and/or (ii) drying.

In accordance with certain embodiments of the invention, the thickness of the applied layer (e.g., coating of the liquid-containing pre-passivation layer to form the passivation layer) may be controlled by placing a transparent cover on top the uncured admixture supported by a spacer. In this regard, the liquid-containing pre-passivation layer may be irradiated and/or heated to cure the liquid-containing pre-passivation layer and remove the liquid (e.g., water and/or organic solvent) to form the passivation layer. Other methods of application of the passivation layer to the electrode may include dip coating, blade coating, spin coating, and spray coating, as well as other printing techniques such as stencil printing, screen printing, droplet printing, aerosol jet printing and extrusion printing.

In accordance with certain embodiments of the invention, the coating of the at least a first portion of the first surface with the passivation-composition may comprise placing a layer of the passivation-composition on top of at least a portion of the first surface of the electrode-composition and applying a slight pressure or external force (e.g., via a direct air stream or weight) to the passivation-composition to facilitate penetration of the passivation-composition into the body of the electrode-composition. In accordance with certain embodiments of the invention, the application of pressure to the passivation-composition may comprise a positive pressure (e.g., via a direct air stream or weight) or a negative pressure (e.g., application of a vacuum to draw or pull the passivation-composition into the body or pores of the electrode-composition). For example, the electrode-composition may comprise a porous structure having a plurality of pores extending from the surface of the electrode-composition into the body of the electrode-composition. In accordance with certain embodiments of the invention, the passivation-composition may be allowed or forced (e.g., by applying a slight pressure or external force onto the passivation-composition to facilitate entry of the passivation-composition into the pores) into and fill at least a portion of the pores to provide a more con formal coating layer of the passivation-composition. In accordance with certain embodiments of the invention, the passivation-composition may be subjected to a drying operation (e.g., solvent evaporation) and/or cross-linking operation after the passivation-composition has filled and/or entered at least a portion of the pores of the electrode-composition to provide a conformally coated passivation layer.

In accordance with certain embodiments of the invention, drying the liquid-containing pre-passivation layer may comprise subjecting this layer to conditions sufficient to ensure the passivation layer comprises less than 10% by weight, such as less than 5% by weight, or less than 1% by weight of water, an organic solvent, or both. In accordance with certain embodiments of the invention, the passivation layer may be devoid of water, an organic solvent, or both.

Figure 6:
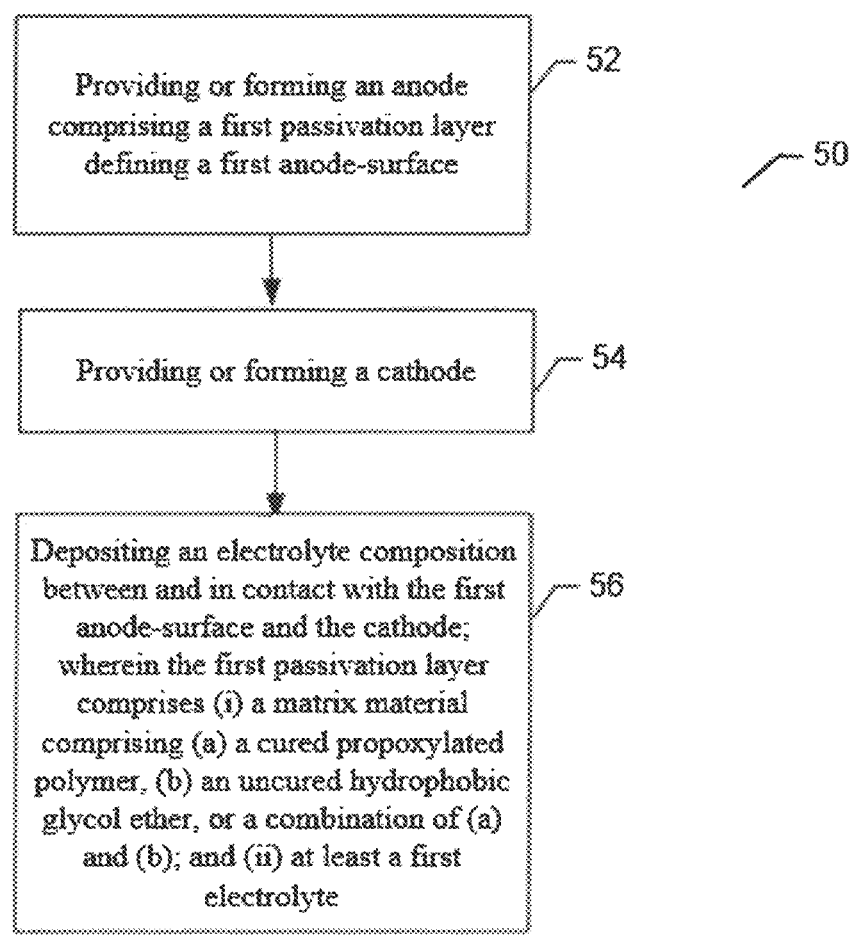
FIG. 6 illustrates a flow diagram of a method for forming an electrochemical cell in accordance with certain embodiments of the invention.

In another aspect, embodiments of the present invention provide a method of forming an electrochemical cell. FIG. 6, for example, illustrates a method 50 of forming an electrochemical cell. As shown in FIG. 6, the method 50 may include providing or forming an anode comprising a first passivation layer as described herein and defining a first anode-surface at operation 52. The method may also comprise providing or forming a cathode as described herein at operation 54, and depositing an electrolyte composition between and in contact with the first anode-surface and tire cathode at operation 56. In accordance with certain embodiments of the invention, the first passivation layer may comprise: (i) a matrix material comprising (a) a cured propoxylated polymer, (b) an uncured hydrophobic glycol ether, or a combination of (a) and (b); and (ii) at least a first electrolyte.

In accordance with certain embodiments of the invention, the method may comprise providing or forming a cathode comprising a second passivation layer defining a first, cathode-surface, and depositing the electrolyte composition between and in contact with the first anode-surface and the first cathode-surface. In accordance with certain embodiments of the invention, the methods may comprise subjecting the first passivation layer, the second passivation layer, or both to a drying and/or radically curing operation as described herein either before or after assembly of the electrochemical cell. For example, one or both of the first or second passivation layers may be subjected to a drying and/or radically curing operation as described herein before the electrolyte composition (e.g., aqueous-based GPE) is positioned between and in contact with the anode and cathode. Additionally or alternatively, the drying and/or radically curing operation may be performed after the electrolyte composition (e.g., aqueous-based GPE) is positioned between and in contact with the anode and cathode. For example, any liquid-containing passivation-composition (e.g., uncured or not cross-linked) may be radically cured after the electrolyte composition (e.g., aqueous-based GPE) is positioned between and in contact with the anode and cathode.

In accordance with certain embodiments of the invention, the electrolyte composition may comprise: (i) a GPE having a cross-linked three-dimensional polymer network, an electrolyte absorbed by the GPE, and water, or (ii) a GPE having a cross-linked three-dimensional polymer network, and a DBS, or (iii) a DES; or (iv) a GPE having a cross-linked three-dimensional polymer network, a DES, and water.

EXAMPLES

The present disclosure is further illustrated by the following examples, which in no way should be construed as being limiting. That is, the specific features described in the following examples are merely illustrative and not limiting.

General Procedures for Passivation Layer Formulation and Application to and in Electrochemical Cells For the following working examples, several abbreviations are used for some of the materials. The following is a list of the materials and their associated abbreviations:
PPG=poly(propylene glycol);
TPnB=tri(propylene glycol) butyl ether:
PPGA=poly(propylene glycol) acrylate, Mn=475;
PPGMA=poly(propylene glycol) methacrylate;
PPGDA=poly(propylene glycol) diacrylate, Mn=800;
PPGDMA=poly(propylene glycol) dimethacrylate;
TMPPTA=trimethylolpropane propoxylate triacrylate, Mc=644; and
LiTFSI=lithium bis(trifluoromethanesulfonyl)imide.

For Passivation Formulations Containing up to 30% LiTFSI

The electrochemical cell included a passivation layer, which was formed thereon before receiving an initial charge, formed from a passivation-composition including a variety of monomeric constituents forming the matrix material, which are identified with each specific example and figures associated with each example, and 0.5 wt % (relative to the total monomer mass) Irgacure 819 pr DMPA as a photoinitiator. LiTFSI as a 30 wt. % concentration (relative to total polymer mass) was also added to the passivation-composition. Organic solvents were optionally added to aid in the dissolution and subsequent electrode penetration (e.g., 10-50 wt. % based on total monomer mass). The Lithium Titanate (LTO) anode (4.6 mg active loading) was allowed to soak in the above mixture for at least 10 minutes. The electrodes were removed from the solution, stripped of excess passivation solution, and then exposed to UV light for 30 seconds. The coated electrodes were then optionally dried in an oven at 85-100° C. for at least 15 minutes. After cooling, the LTO electrode was then topped with the indicated pre-cured GPE recipe, and subsequently topped with and Lithium Manganese Oxide (LMO) cathode (8.2 mg active loading). Alternatively, the GPE could be cured directly on top of the LMO cathode before being placed on top of the passivation-coated LTO. The resulting structures were then placed in a coin cell case for testing.

In some cases, the passivation compositions are not UV cured (e.g., compositions with PPG and Dowanol® TPnB). Solutions were prepared as mixtures with LiTFSI, applied to the electrodes, stripped of excess liquid, and topped with the GPE-topped cathodes.

For Passivation Formulation Containing 50% LiTFSI

Passivation formulations containing 50% LiTFSI were prepared and used as described above, except that organic solvents (e.g., acetone, acetonitrile, tetrahydrofuran, methyl ethyl ketone, ethyl acetate, methanol in 10-150 wt. % relative to the total monomer and LiTFSI mass) were added to the monomer-LiTFSI mixtures to aid in the dissolution of the salt. The organic solvents were later evaporated from the UV cured passivation layers during the subsequent oven drying step.

In some cases, the passivation compositions are not UV cured (e.g., compositions with PPG and Dowanol® TPnB). Solutions were prepared as mixtures with LiTFSI, applied to the electrodes, stripped of excess liquid, and topped with the GPE-topped cathodes.

Example 1

Figure 7A:
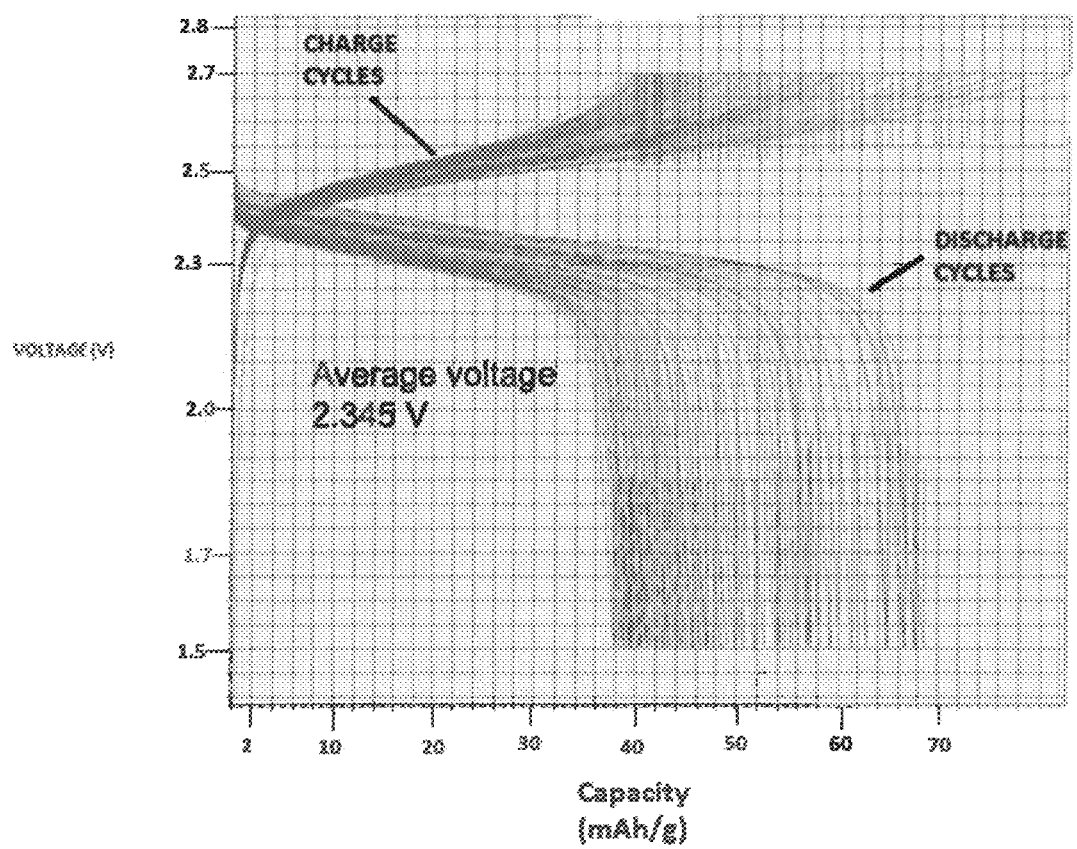
FIG. 7A shows multiple cycles for an electrochemical cell in accordance with certain embodiments of the invention.
Figure 7B:
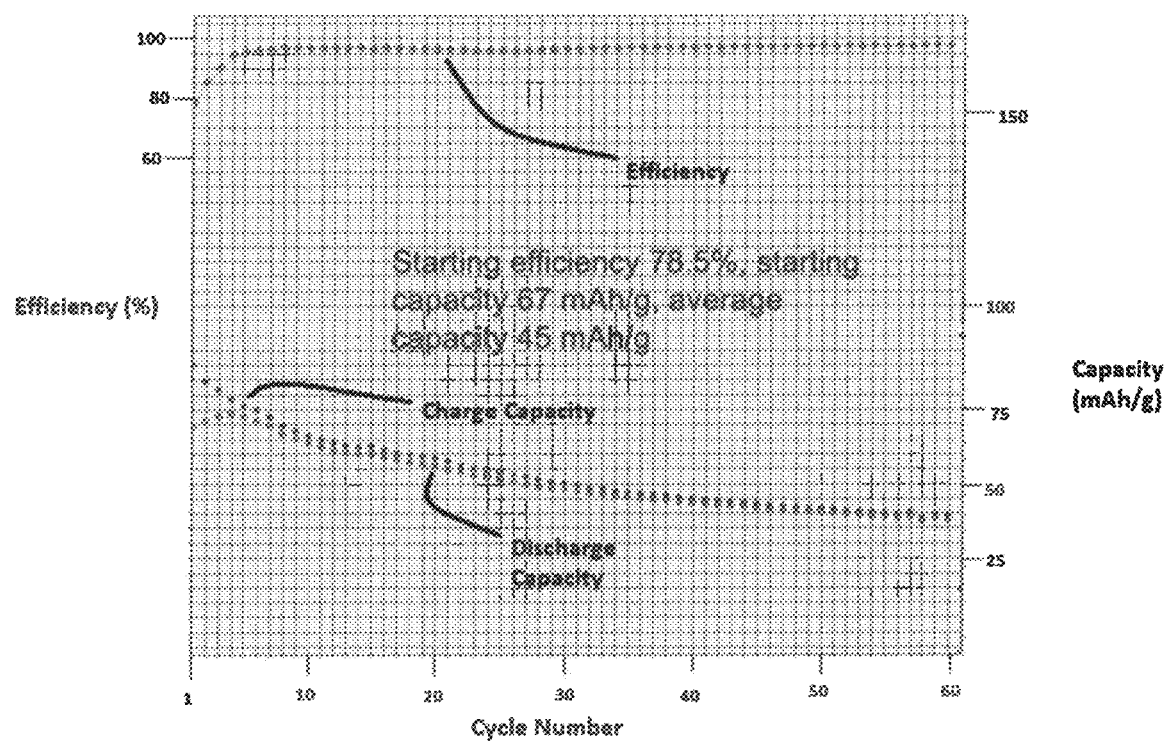
FIG. 7B shows the capacity vs. cycle life and efficiency vs. cycle life of the same electrochemical cell represented in FIG. 7A.

In accordance with the general procedures above, an electrochemical cell was formed including a hydrophobic passivation layer including the following: 98:2 (wt. %) PPGA:PPGDA, and 50% LiTFSI. The GPE used was as follows: 70% WiBS, 30% polymer (9:90:1 of MPEGA:HEA:PEGDA). FIG. 7A shows multiple cycles for the electrochemical cell and FIG. 7B shows the capacity vs. cycle life and efficiency vs. cycle life of the same electrochemical cell. The starting efficiency was 78.5%. The starting capacity was 67 mAh/g and the average capacity was 45 mAh/g.

Example 2

Figure 8A:
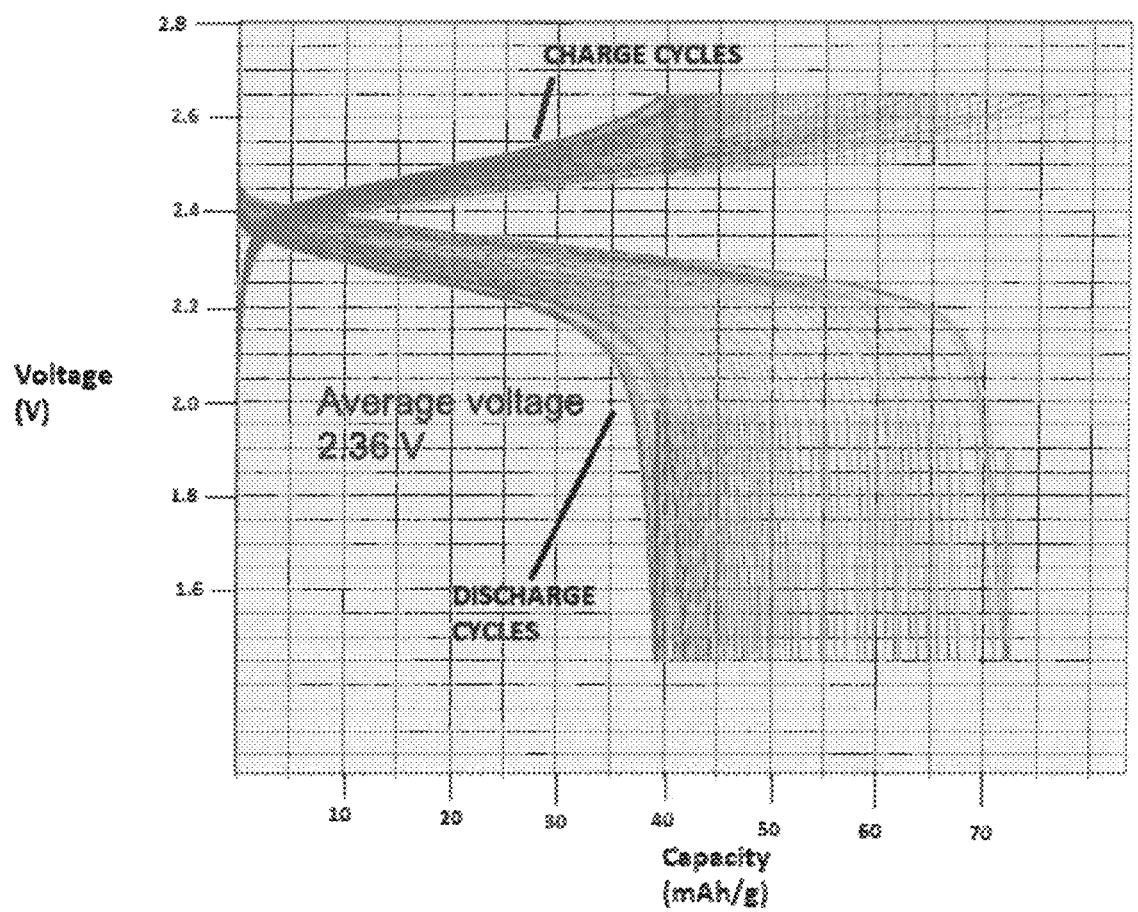
FIG. 8A shows multiple cycles for an electrochemical cell in accordance with certain embodiments of the invention.
Figure 8B:
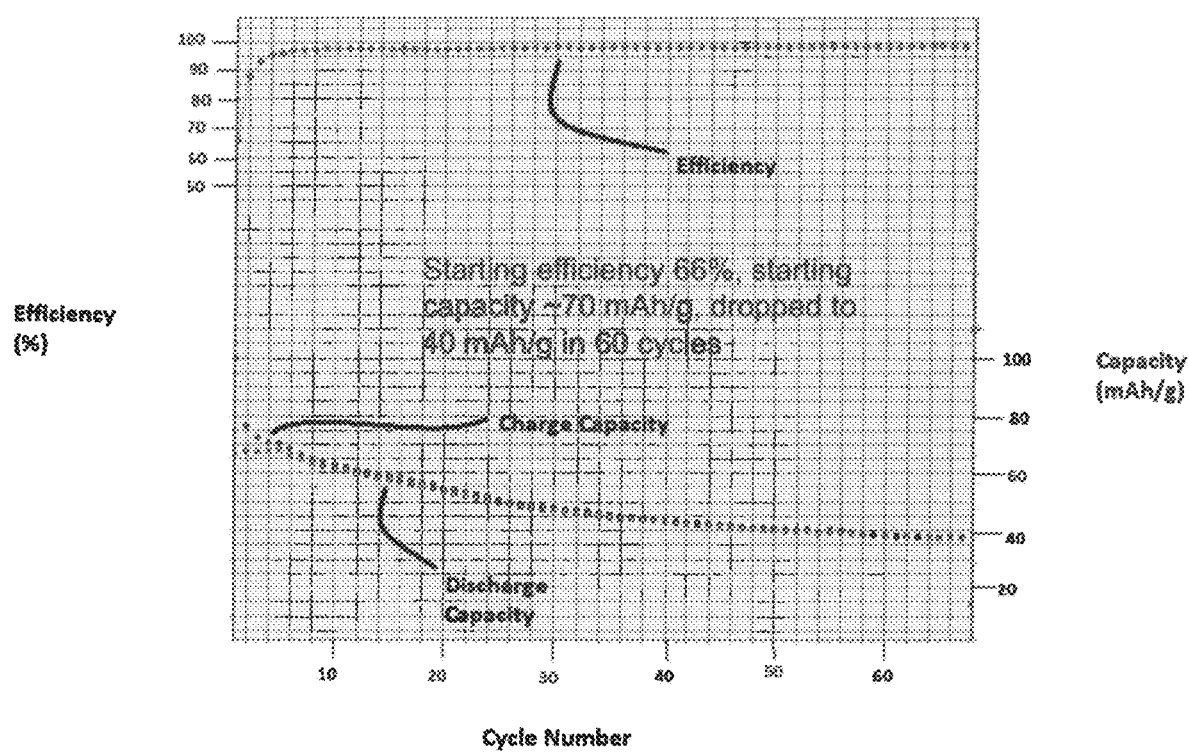
FIG. 8B shows the capacity vs. cycle life and efficiency vs. cycle life of the same electrochemical cell represented in FIG. 8A.

In accordance with the general procedures above, an electrochemical cell was formed including a liquid hydrophobic passivation layer (i.e., uncured) including the following: 50% matrix material of 98:2 (wt. %) PPGA:PPGDA and 50% LiTFSI. The GPE used was as follows: 70% WiBS, 30% polymer (9:90:1 of MPEGA:HEA:PEGDA). FIG. 8A shows multiple cycles for the electrochemical cell and FIG. 8B shows the capacity vs. cycle life and efficiency vs. cycle life of the same electrochemical cell. The starting efficiency was 66%. The starting capacity was about 70 mAh/g and dropped to 40 mAh/g after 60 cycles.

Example 3

Figure 9A:
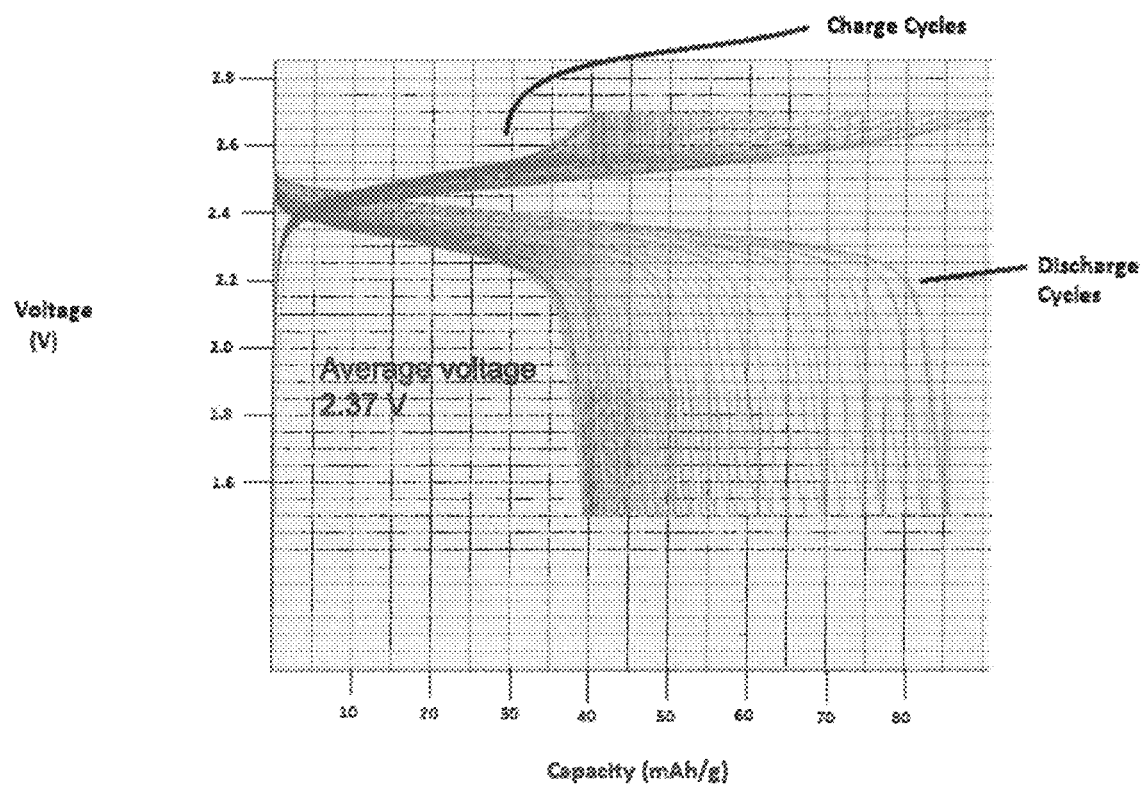
FIG. 9A shows multiple cycles for an electrochemical cell in accordance with certain embodiments of the invention.
Figure 9B:
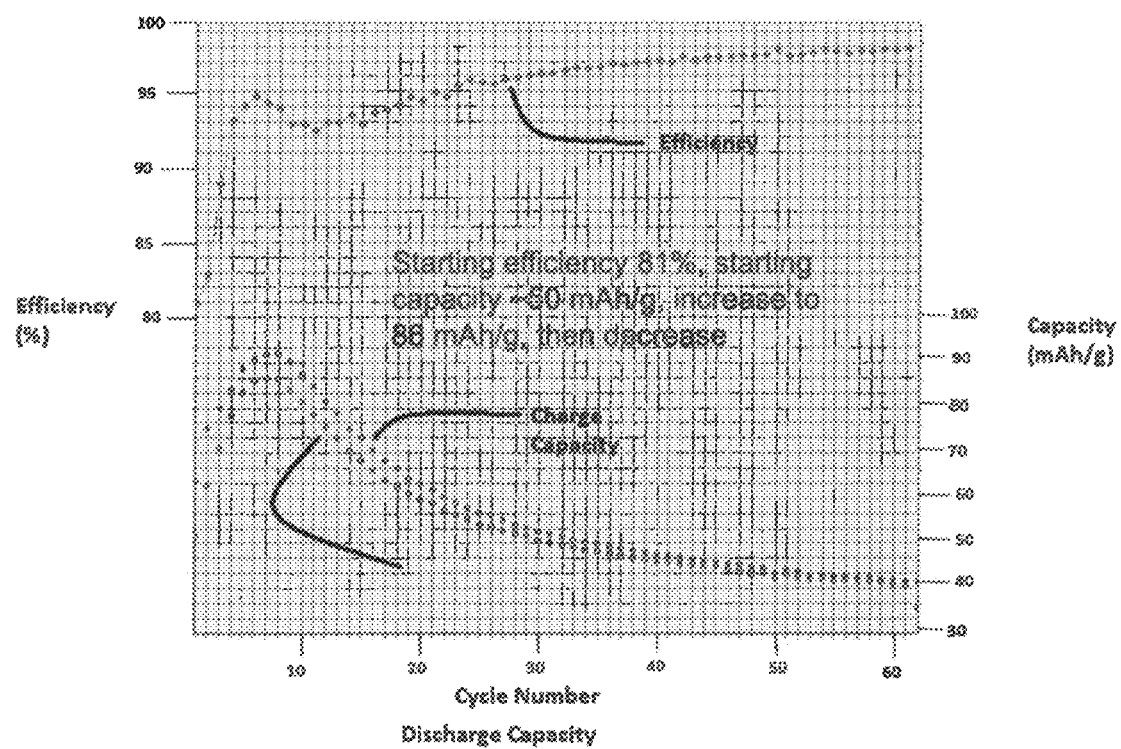
FIG. 9B shows the capacity vs. cycle life and efficiency vs. cycle life of the same electrochemical cell represented in FIG. 9A.

In accordance with the general procedures above, an electrochemical cell was formed including a liquid hydrophobic passivation layer (i.e., uncured) including the following: 20% LiTFSI in 70% PPG (10% acetone). The GPE used was as follows: 70% WiBS, 30% polymer (9:90:1 of MPEGA:HEA:PEGDA). FIG. 9A shows multiple cycles for the electrochemical cell and FIG. 9B shows the capacity vs. cycle life and efficiency vs. cycle life of the same electrochemical cell. The starting efficiency was 81%. The starting capacity was about 50 mAh/g and increased to 86 mAh/g before decreasing.

Example 4

Figure 10A:
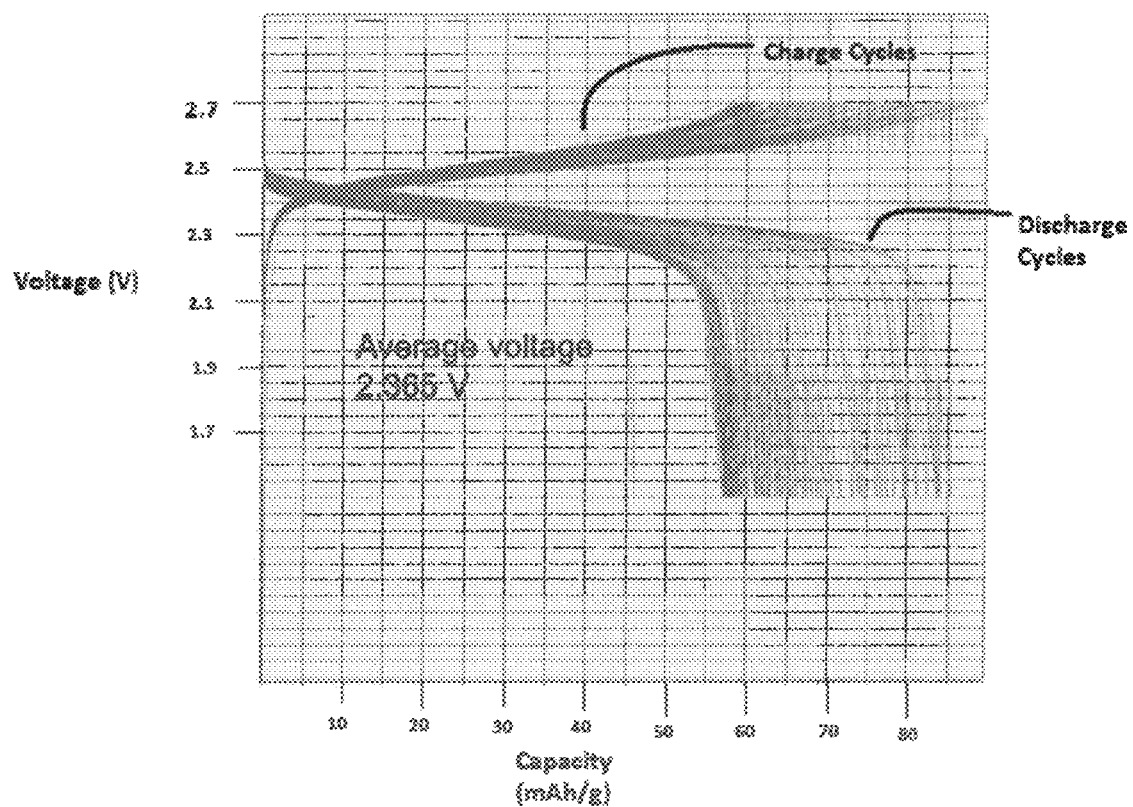
FIG. 10A shows multiple cycles for an electrochemical cell in accordance with certain embodiments of the invention.
Figure 10B:
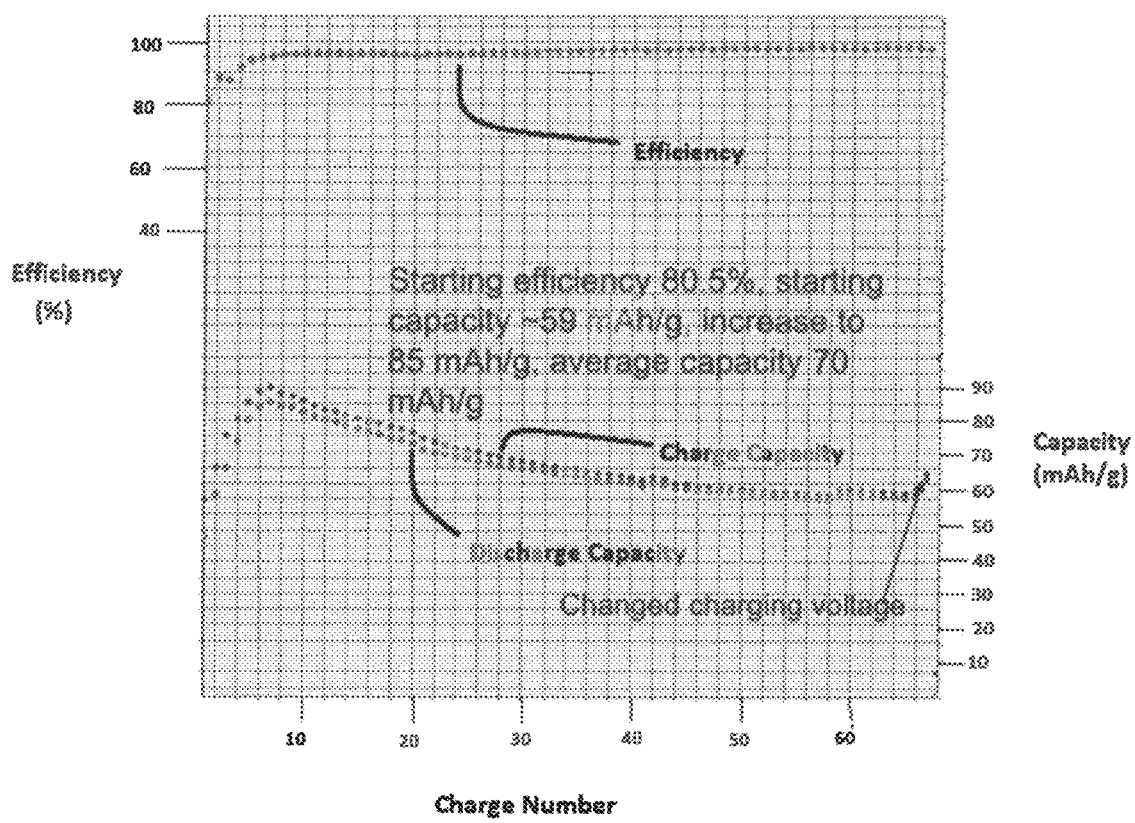
FIG. 10B shows the capacity vs. cycle life and efficiency vs. cycle life of the same electrochemical cell represented in FIG. 10A.

In accordance with the general procedures above, an electrochemical cell was formal including a liquid hydrophobic passivation layer (i.e., uncured) including the following: 40% LiTFSI in 50% PPG (10% acetone). The GPE used was as follows: 70% WiBS, 30% polymer (9:90:1 of MPEGA:HEA:PEGDA). FIG. 10A shows multiple cycles for the electrochemical cell and FIG. 10B shows the capacity vs. cycle life and efficiency vs. cycle life of the same electrochemical cell. The starting efficiency was 80.5%. The starting capacity was about 59 mAh/g and increased to 85 mAh/g, while the average capacity was 70 mAh/g.

Example 5

Figure 11A:
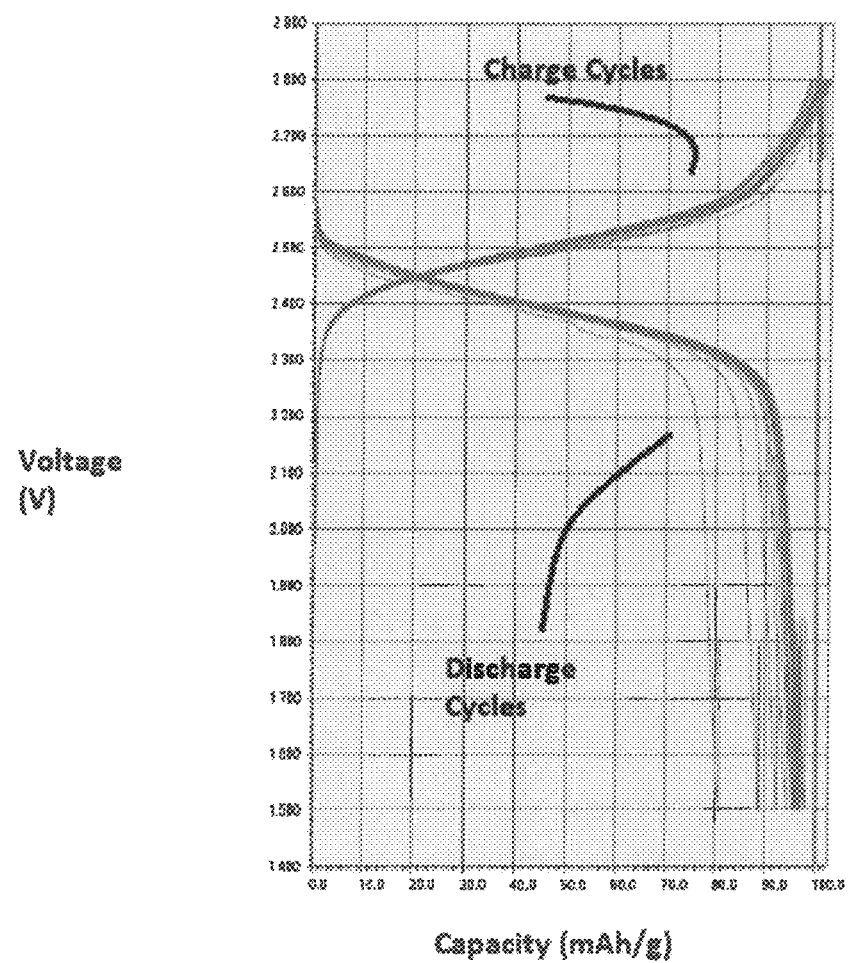
FIG. 11A shows multiple cycles for an electrochemical cell in accordance with certain embodiments of the invention.
Figure 11B:
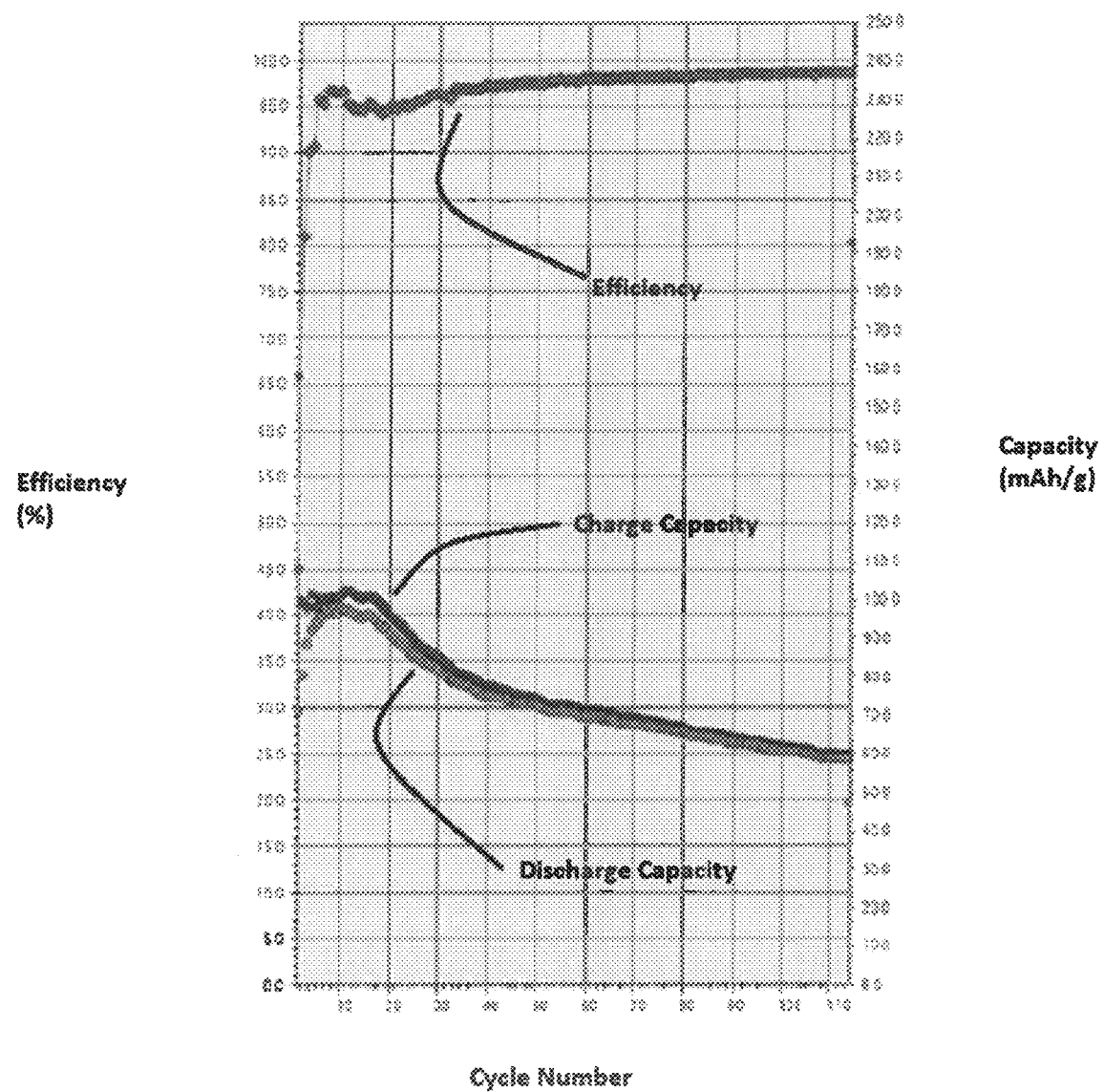
FIG. 11B shows the capacity vs. cycle life and efficiency vs. cycle life of the same electrochemical cell represented in FIG. 11A.

In accordance with the general procedures above, an electrochemical cell was formed including a liquid hydrophobic passivation layer (i.e., uncured) including the following: 20% LiTFSI in 30% PPG (50% acetone). The GPE used was as follows: 75% WiBS, 25% polymer (9:90:1 of MPEGA:HEA:PEGDA). FIG. 11A shows multiple cycles for the electrochemical cell and FIG. 11B shows the capacity vs. cycle life and efficiency vs. cycle life of the same electrochemical cell. The starting efficiency was about 45%. The starting capacity was about 75 mAh/g.

Example 6

Figure 12A:
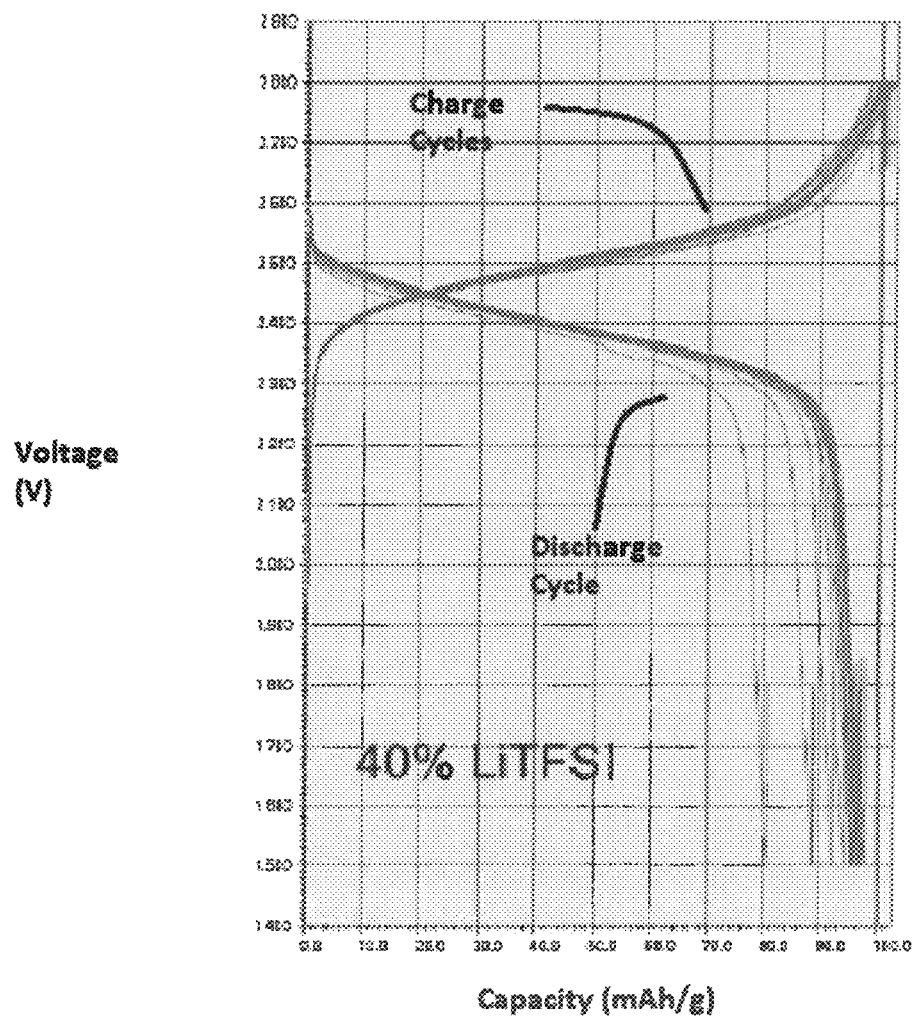
FIGS. 12A-12B show a comparison of two electrochemical cells in accordance with embodiments of the invention, in which the electrochemical cell of FIG. 12A had a higher LiTFSI content in the passivation layer as compared to the electrochemical cell of FIG. 12B.
Figure 12B:
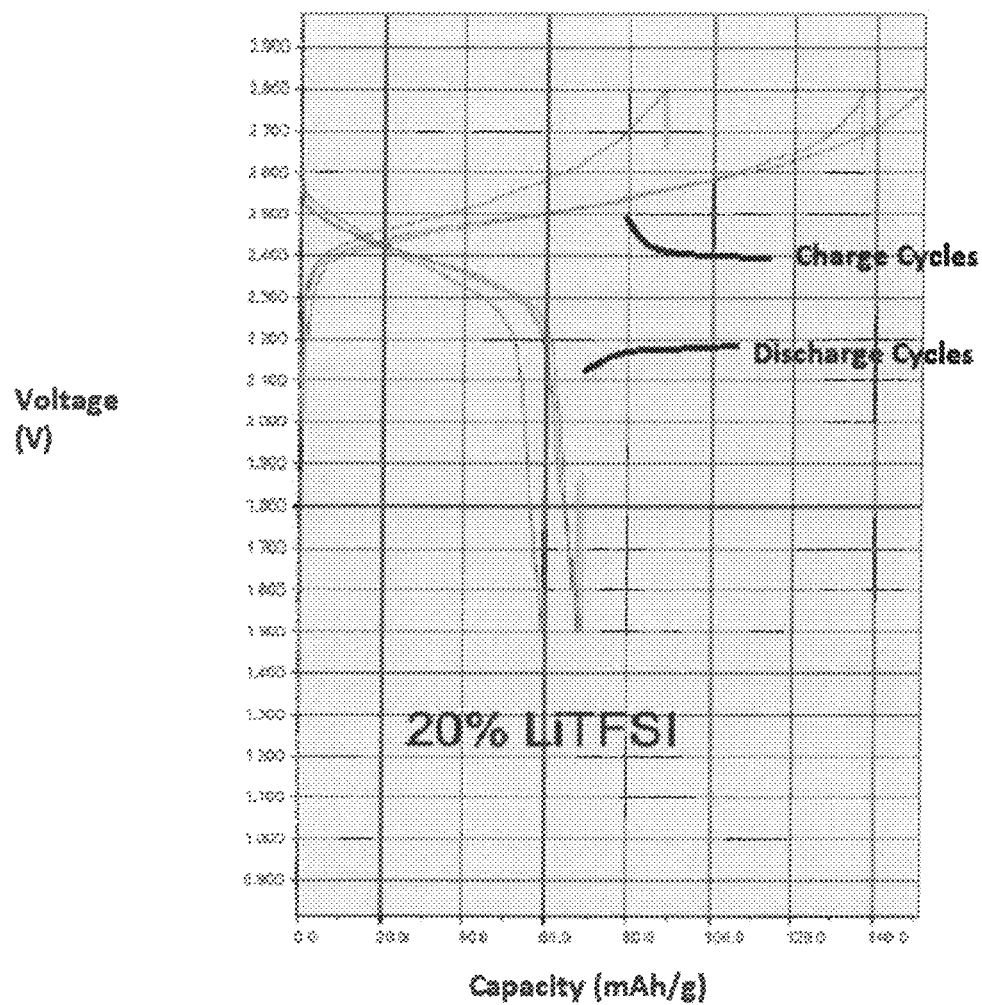

FIGS. 12A-12B provide a comparison of the two electrochemical cells from Examples 4 and 5, respectively. FIG.

12A shows that the electrochemical cell with a passivation layer with 40% LiTSFI provided a larger specific capacity that the electrochemical cell with a passivation layer with 20% LiTSFI.

Example 7

Figure 13A:
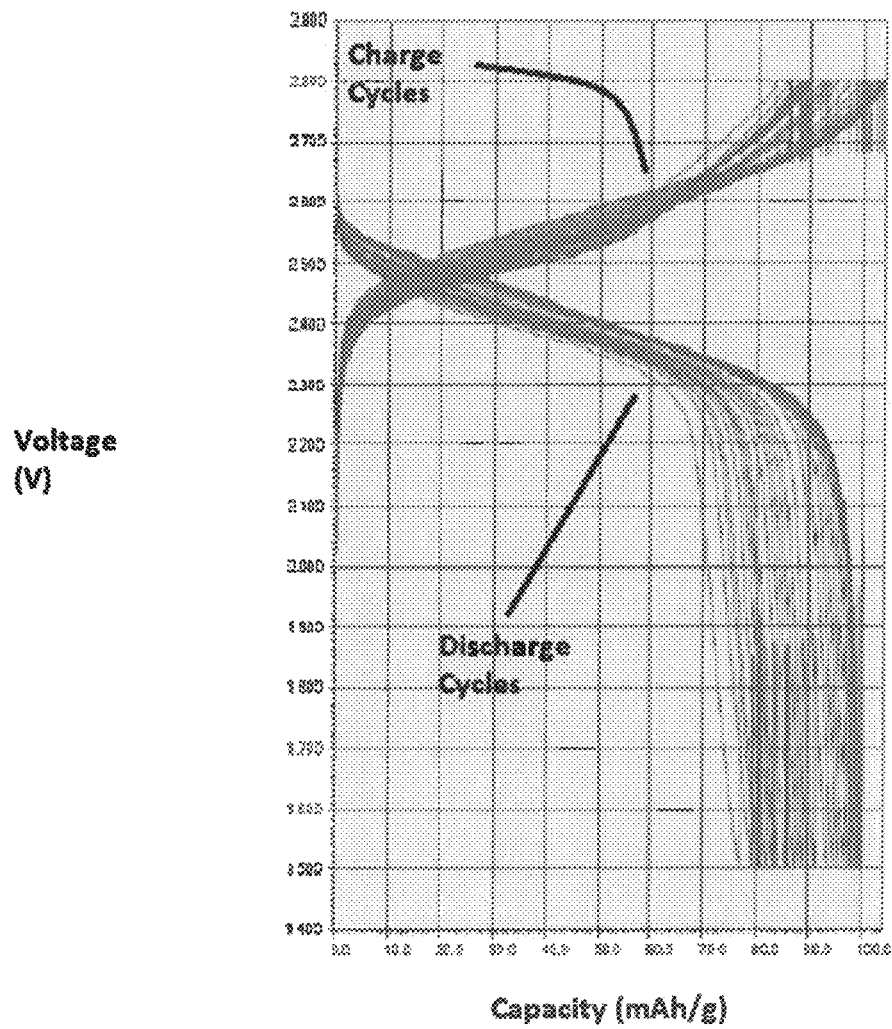
FIG. 13A shows multiple cycles for an electrochemical cell in accordance with certain embodiments of the invention.
Figure 13B:
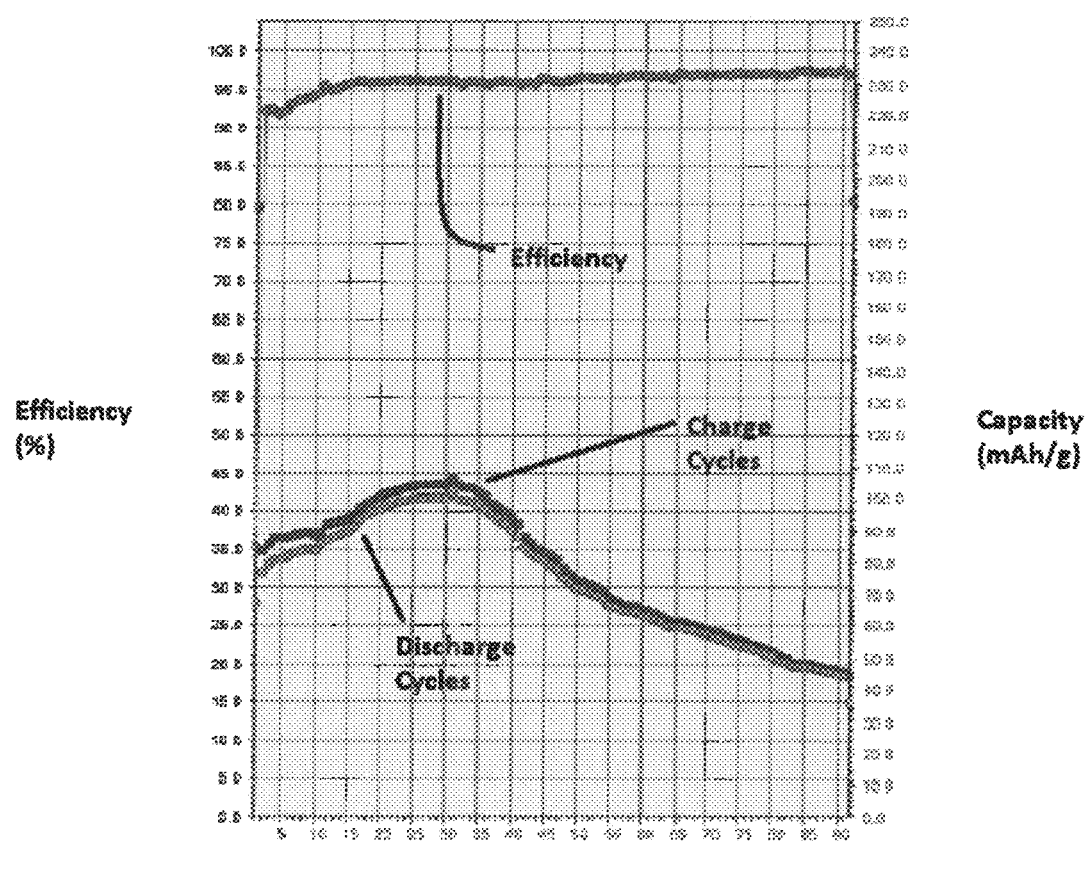
FIG. 13B shows the capacity vs. cycle life and efficiency vs. cycle life of the same electrochemical cell represented in FIG. 13A.

In accordance with the general procedures above, an electrochemical cell was formed including a liquid hydrophobic passivation layer (i.e., uncured) including the following: 10% LiTFSI in 40% Dowanol® TPnB (50% acetone). The GPE used was as follows; 75% WiBS, 25% polymer (9:90:1 of MPEGA:HEA:PEGDA). FIG. 13A show's multiple cycles for the electrochemical cell and FIG. 13B shows the capacity vs. cycle life and efficiency vs. cycle life of the same electrochemical cell. The starting efficiency was about 35%. The shirting capacity was about 65 mAh/g and increased to almost 110 mAh/g.

Example 8

Figure 14A:
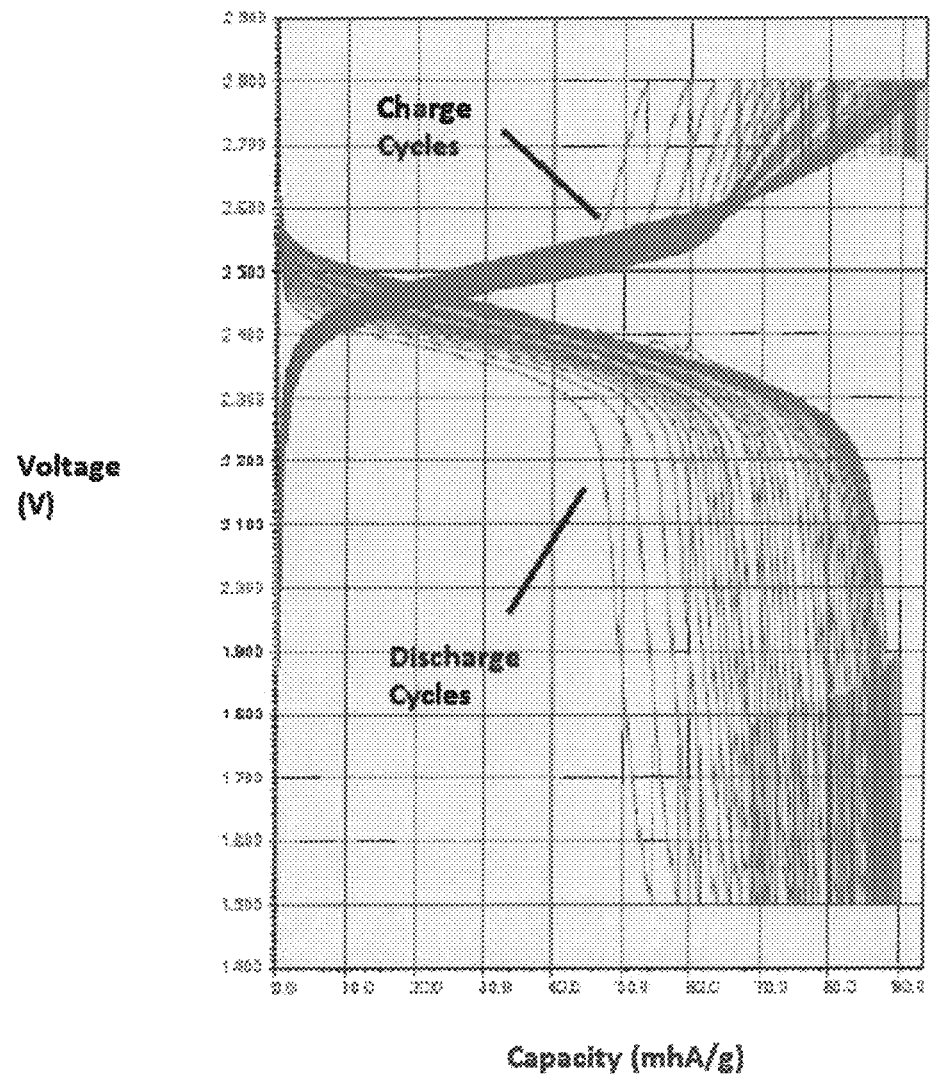
FIG. 14A shows multiple cycles for an electrochemical cell in accordance with certain embodiments of the invention.
Figure 14B:
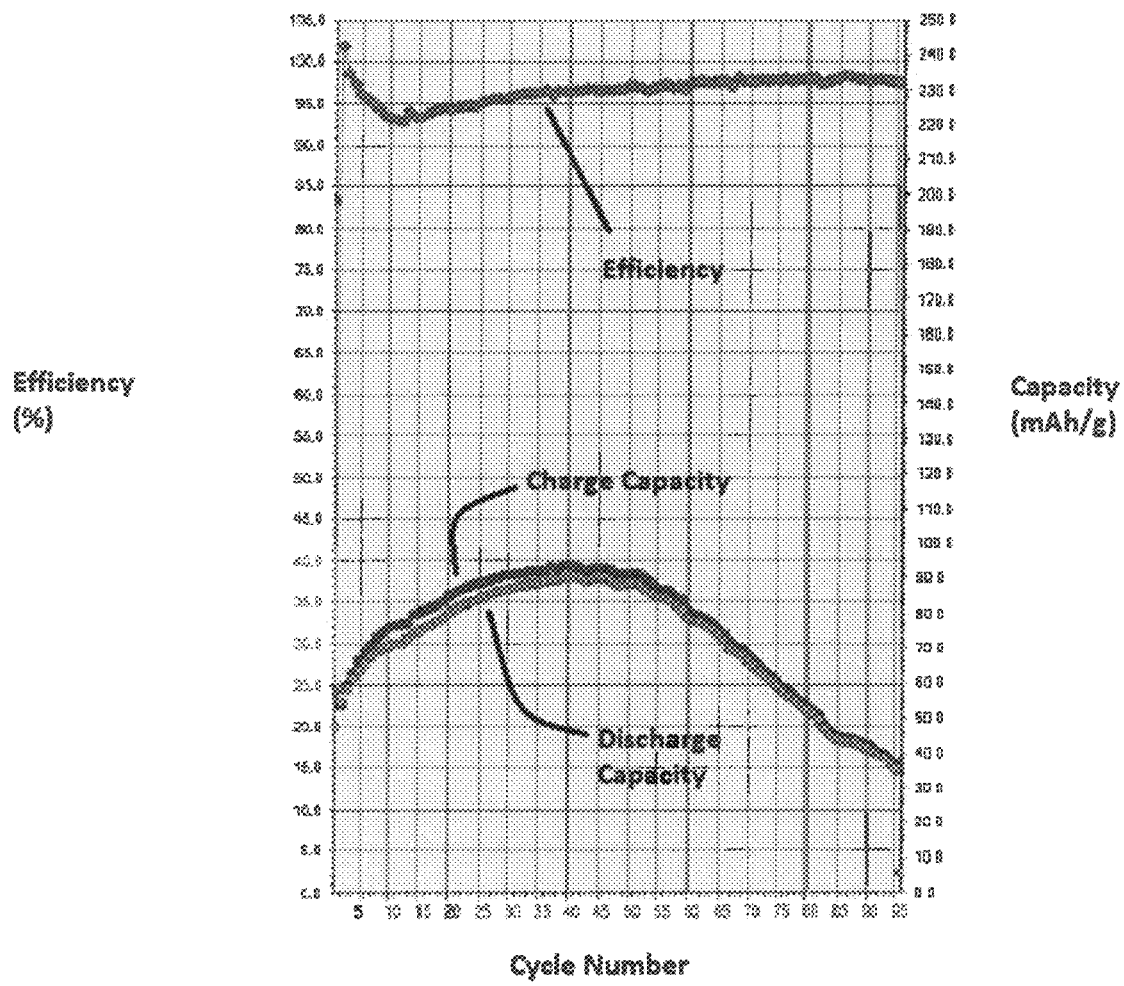
FIG. 14B shows the capacity vs. cycle life and efficiency vs. cycle life of the same electrochemical cell represented in FIG. 14A.

In accordance with the general procedures above, an electrochemical cell was formed including a liquid hydrophobic passivation layer (i.e., uncured) including the following: 30% LiTFSI in 40% Dowanol® TPnB (30% acetone). The GPE used was as follows: 75% WiBS, 25% polymer (9:90:1 of MPEGA:HEA:PEGDA). FIG. 14A shows multiple cycles for the electrochemical cell and FIG. 14B shows the capacity vs. cycle life and efficiency vs. cycle life of the same electrochemical cell. The starting efficiency was about 25%. The starting capacity was about 50 mAh/g and increased to almost 95 mAh/g.

Figure 14C:
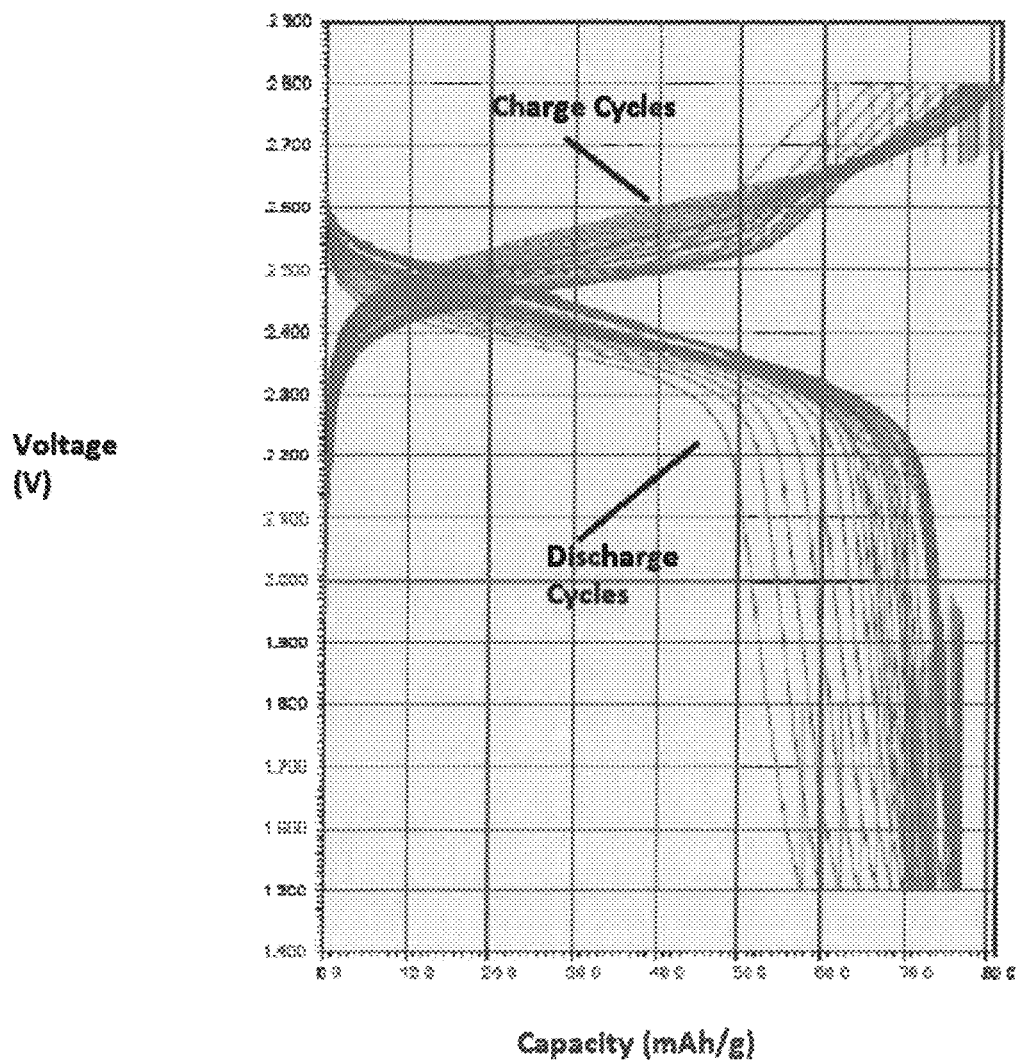
FIG. 14C shows multiple cycles for an electrochemical cell in accordance with certain embodiments of the invention.
Figure 14D:
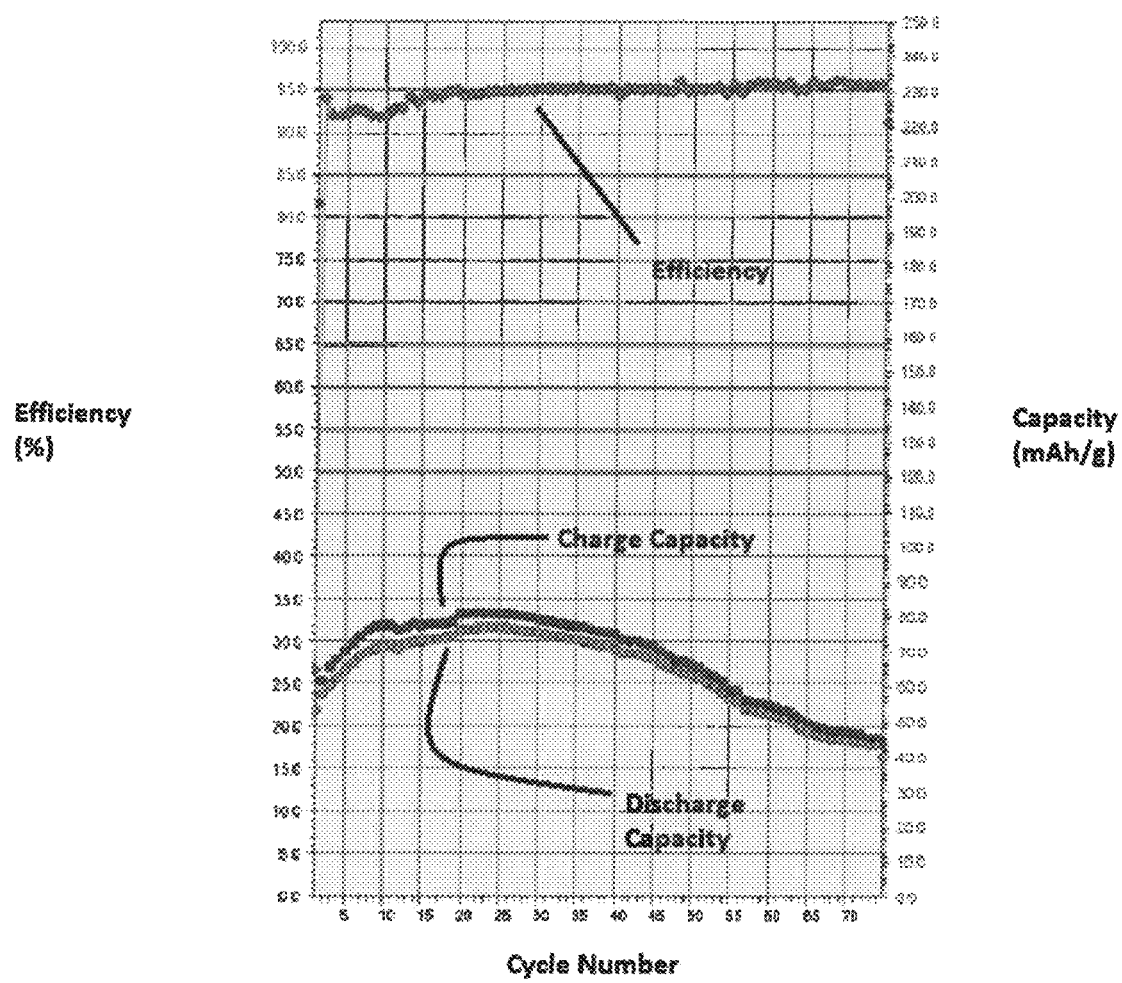
FIG. 14D shows the capacity vs. cycle life and efficiency vs. cycle life of the same electrochemical cell represented in FIG. 14C.

A second electrochemical cell having the same construction was prepared. FIG. 14C shows multiple cycles for the second electrochemical cell and FIG. 14D shows the capacity vs. cycle life and efficiency vs. cycle life of the second electrochemical cell. The starting efficiency was about 25%. The starting capacity was above 50 mAh/g and increased to almost 85 mAh/g.

Example 9

Figure 15A:
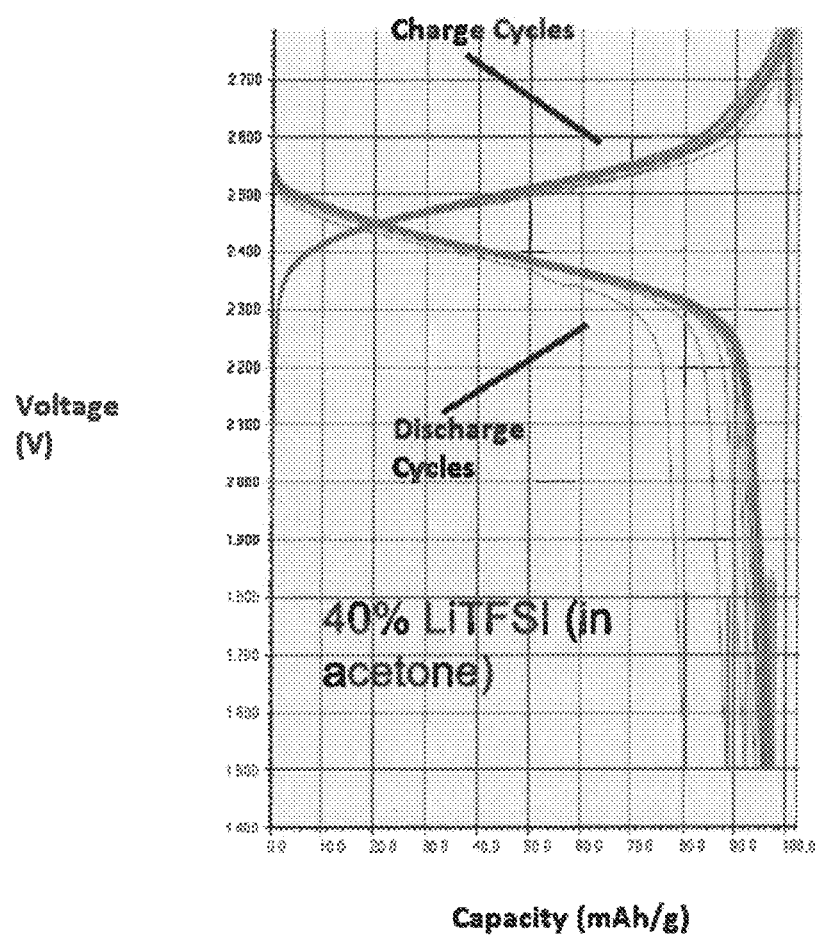
FIGS. 15A-15C illustrate a comparison of electrochemical cells including different amounts of LiTFSI in the passivation layers.
Figure 15B:
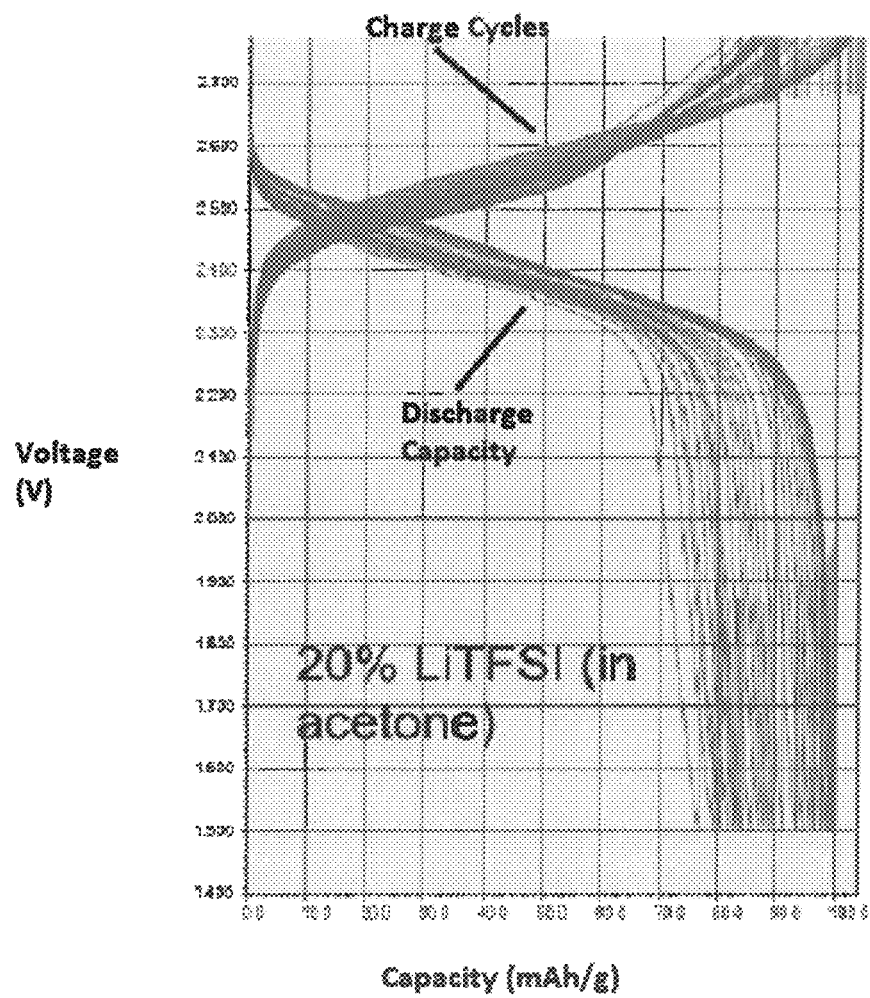
Figure 15C:
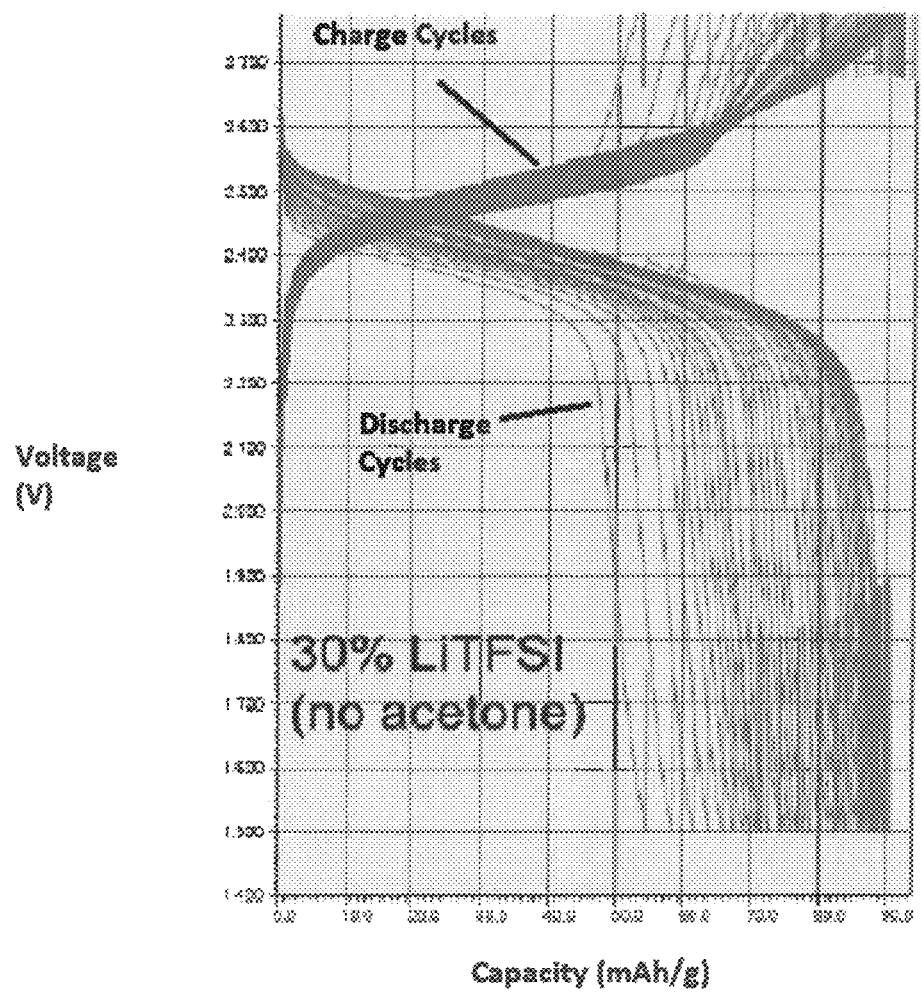

FIGS. 15A-15C illustrate a comparison of electrochemical cells including different amounts of LiTFSI in the passivation layers. FIG. 15A shows multiple cycles for the electrochemical cell including 40% LiTFSI without the presence of acetone in the formation of the passivation layer. FIG. 15B shows multiple cycles for the electrochemical cell including 20% LiTFSI in acetone. FIG. 15C shows multiple cycles for the electrochemical cell including 30% LiTFSI without the presence of acetone in the formation of the passivation layer.

Example 10

Figure 16A:
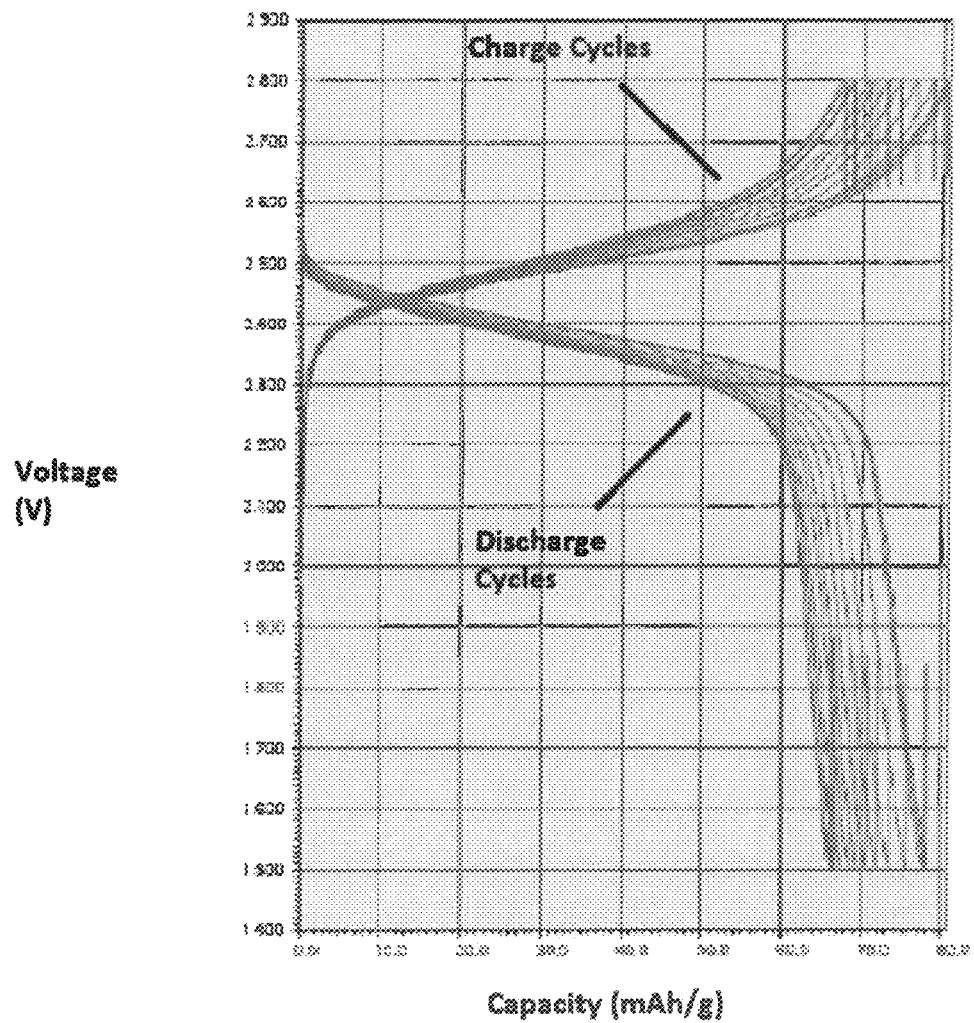
FIG. 16A shows multiple cycles for an electrochemical cell in accordance with certain embodiments of the invention.
Figure 16B:
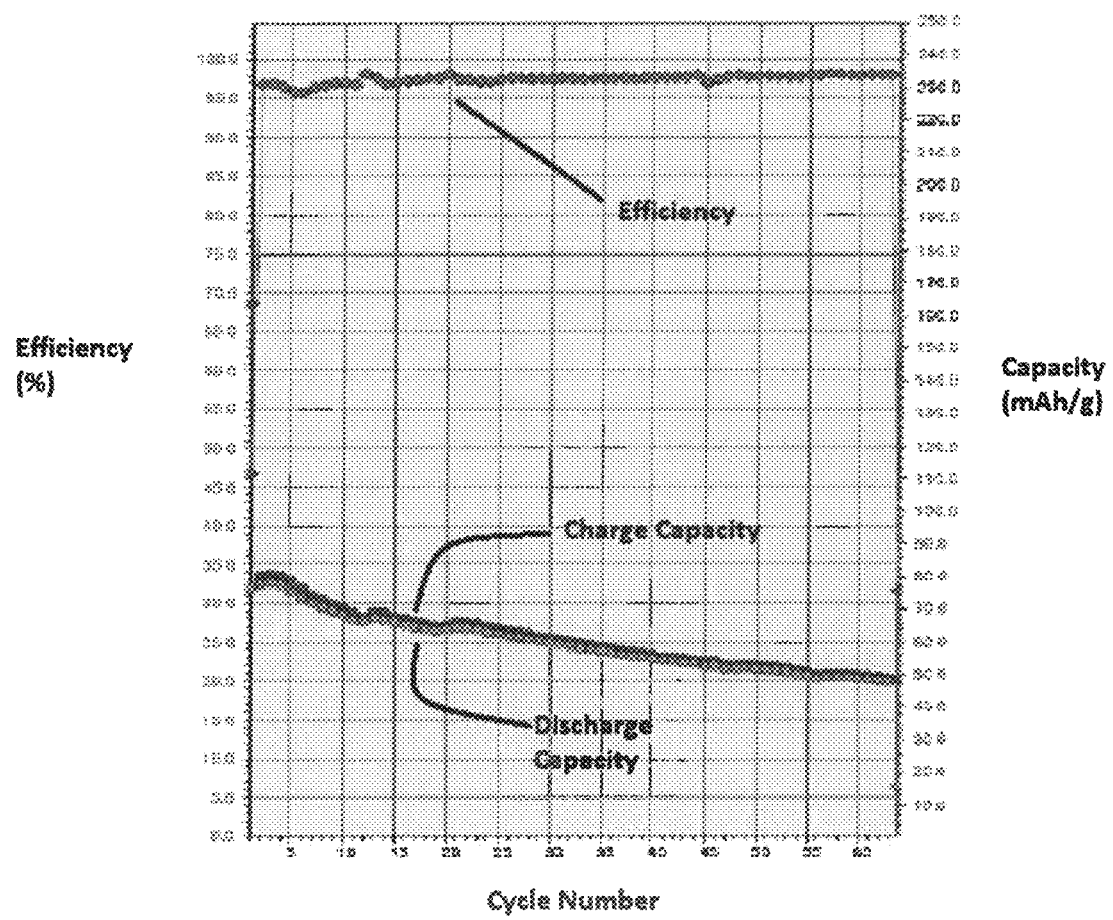
FIG. 16B show's the capacity vs. cycle life and efficiency vs. cycle life of the same electrochemical cell represented in FIG. 16A.

In accordance with the general procedures above, an electrochemical cell was formed including a hydrophobic passivation layer including the following: 30% LiTFSI; 20% matrix material 98:2 (wt. %) PPGMA:C12DMA (50% acetone). The GPE used was as follows: 75% WiBS, 25% polymer (9:90:1 of MPEGA:HEA:PEGDA). FIG. 16A shows multiple cycles for the electrochemical cell and FIG. 16B shows the capacity vs. cycle life and efficiency vs. cycle life of the same electrochemical cell. The starting efficiency was about 46%. The starting capacity was about 80 mAh/g.

Example 11

Figure 17A:
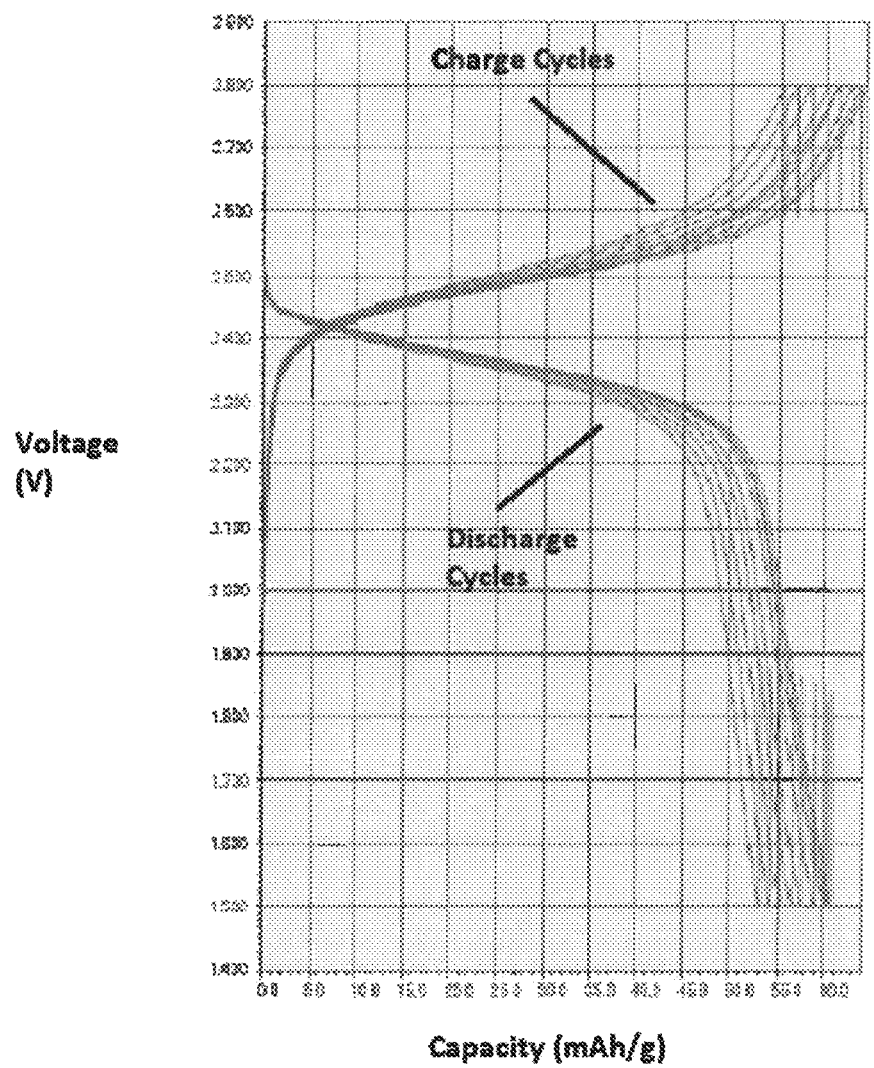
FIG. 17A shows multiple cycles for an electrochemical cell in accordance with certain embodiments of the invention.
Figure 17B:
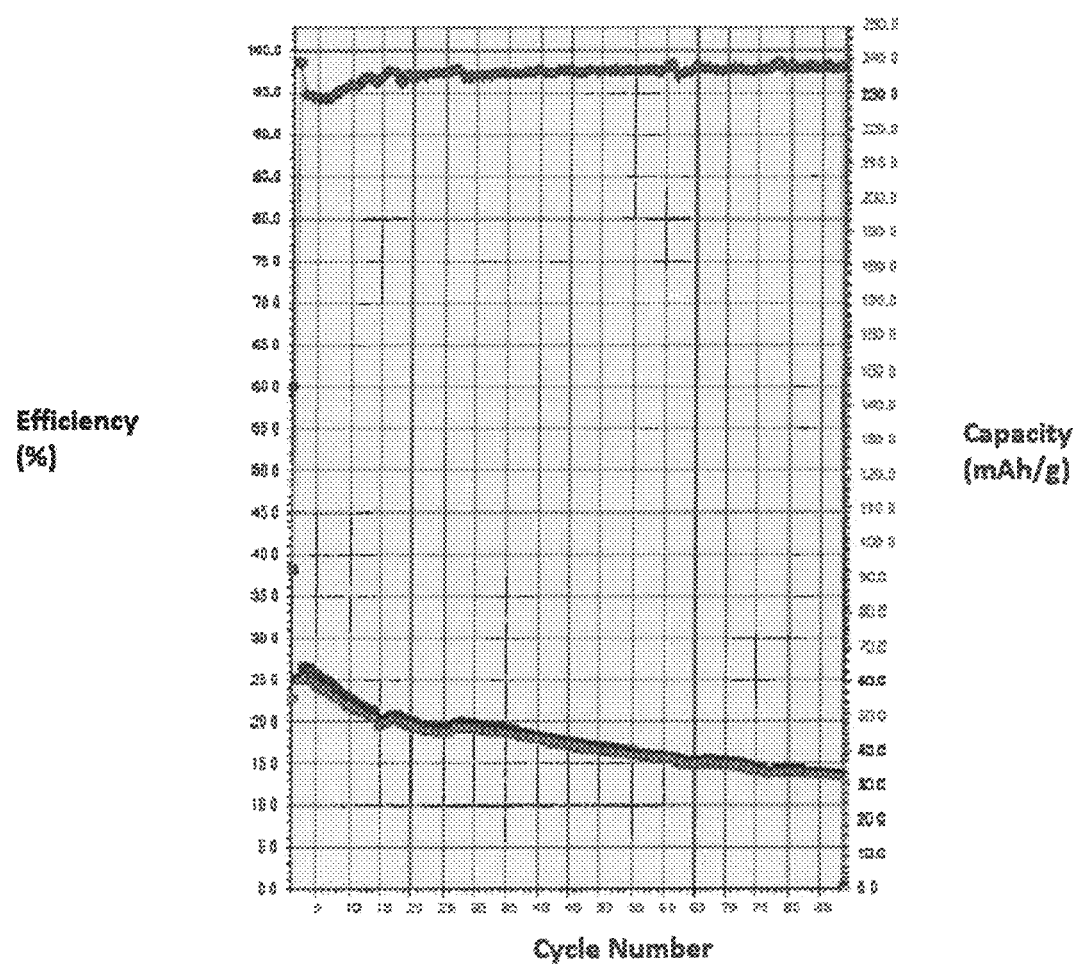
FIG. 17B shows the capacity vs. cycle life and efficiency vs. cycle life of the same electrochemical cell represented in FIG. 17A.

In accordance with the general procedures above, an electrochemical cell was formed including a hydrophobic passivation layer including the following: 30% LiTFSI; 20% matrix material 98:2 (wt. %) PPGMA:C12DMA (50% acetone). The GPE used was as follows: 75% WiBS, 25% polymer (9:90:1 of MPEGA:HEA:PEGDA). FIG. 17A shows multiple cycles for the electrochemical cell and FIG. 17B shows the capacity vs. cycle life and efficiency vs. cycle life of the same electrochemical cell. The starting efficiency was about 40%. The starting capacity was around 60 mAh/g.

Example 12

Figure 18A:
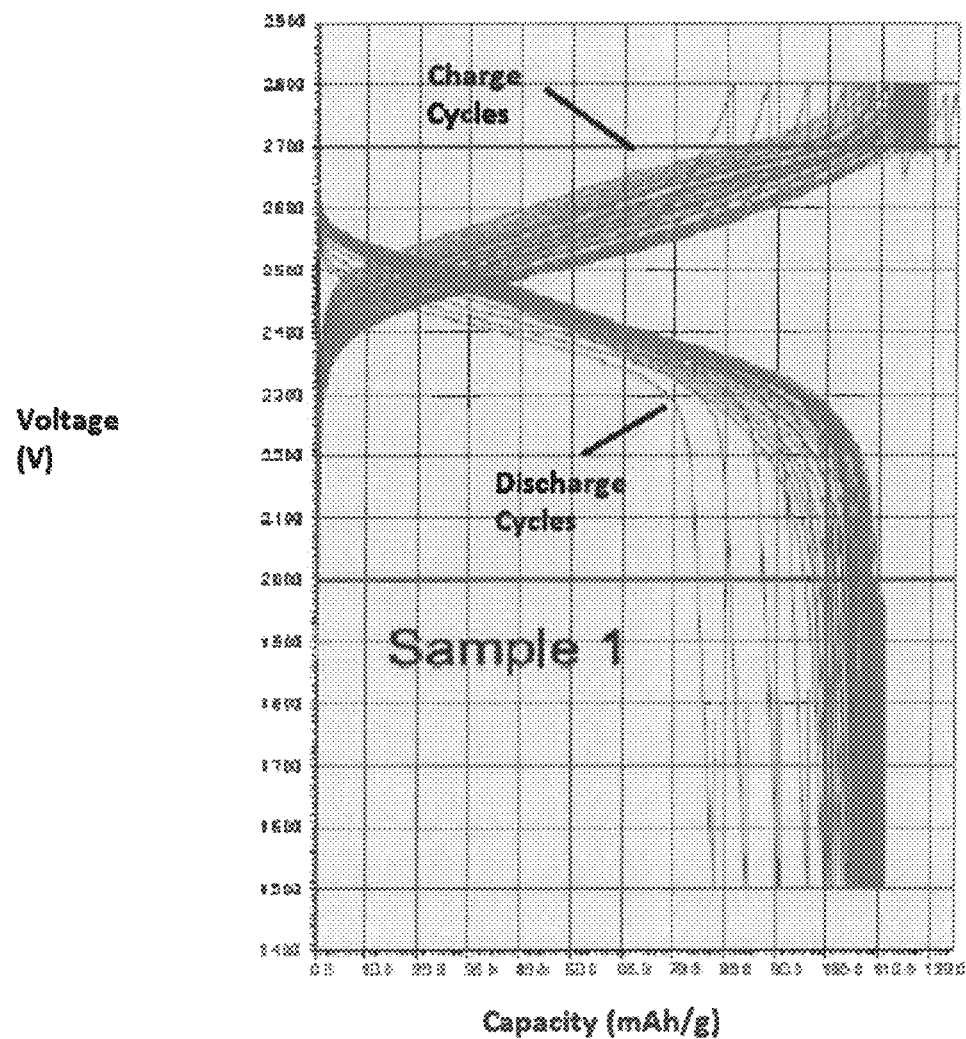
FIG. 18A shows multiple cycles for an electrochemical cell in accordance with certain embodiments of the invention.
Figure 18B:
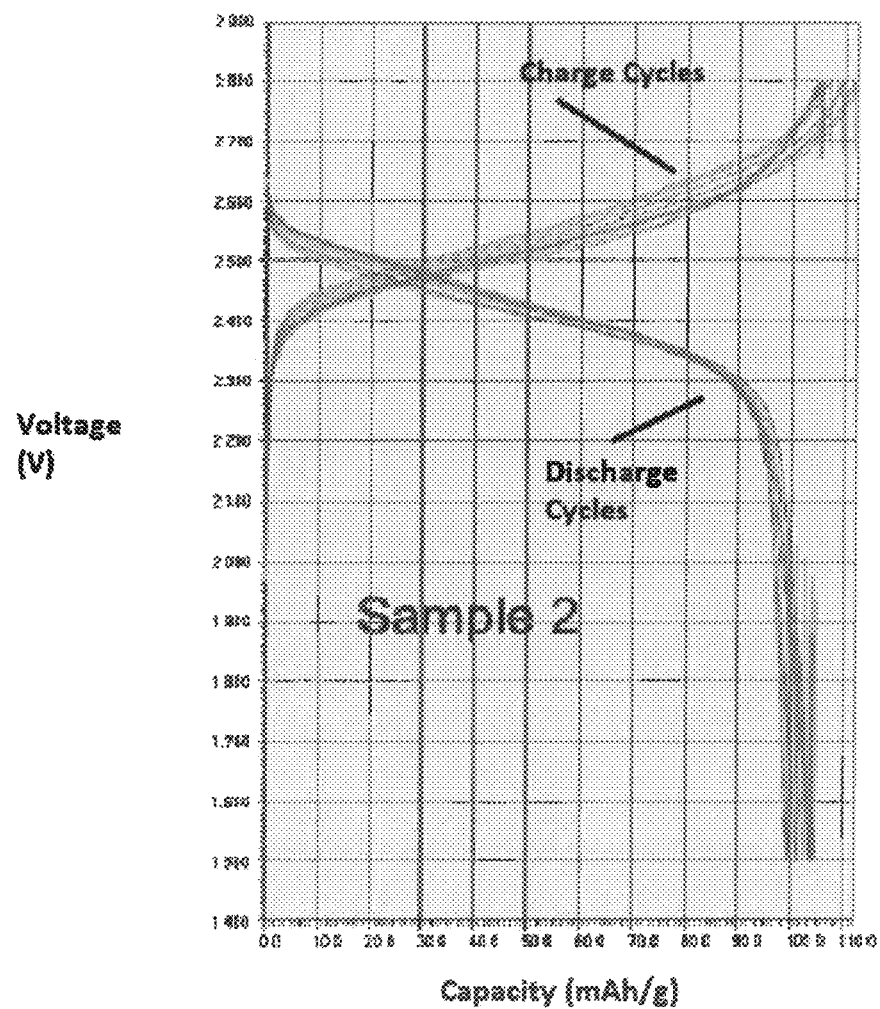
FIG. 18B show's multiple cycles for an electrochemical cell in accordance with certain embodiments of the invention.

FIG. 18A shows multiple cycles for a first electrochemical cell that was formed including a hydrophobic passivation layer. The LTO was roll-coated with a FC-40 fluorinated solvent. The passivation layer was formed from the following: 10% LiTFSI, 40% Dowanol® TPnB (50% acetone). The GPE used was as follows: 75% WiBS, 25% polymer (9:90:1 of MPEGA:HEA:PEGDA). FIG. 18B shows multiple cycles for a second electrochemical cell haring the same construction as the first electrochemical cell.

Example 13

Figure 19:
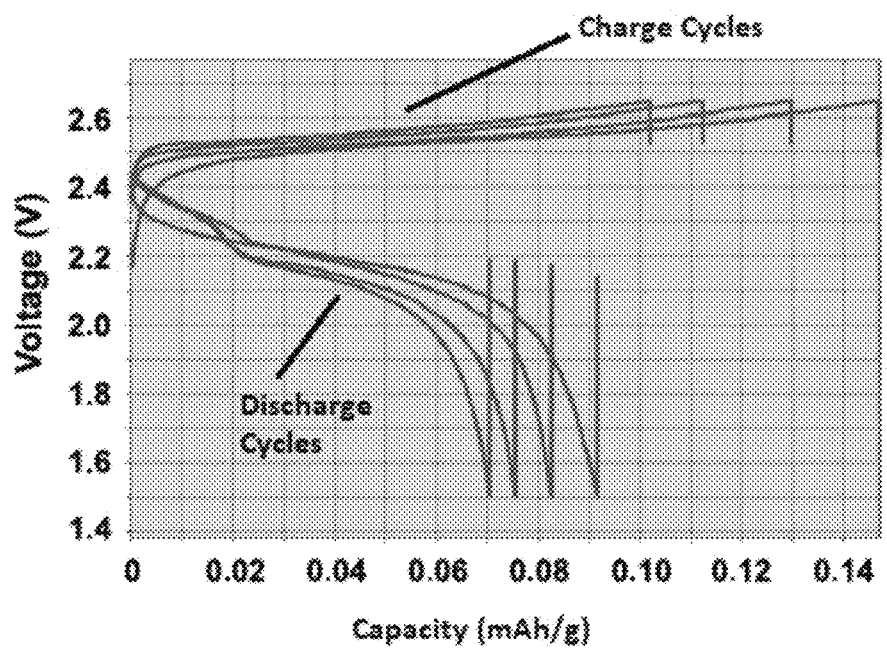
FIG. 19 shows initial cycles for an electrochemical cell in accordance with certain embodiments of the invention.

FIG. 19 shows initial cycles for an electrochemical cell constructed in accordance with the general procedures above. The passivation layer was formed from 100% TMPTTA as the matrix material and included 30 wt. % LiTFSI. The GPE used was as follows: 70% WiBS, 30% polymer (49.5:49.5:1 of MPEGA:HEA:PEGDA).

Example 14

Figure 20A:
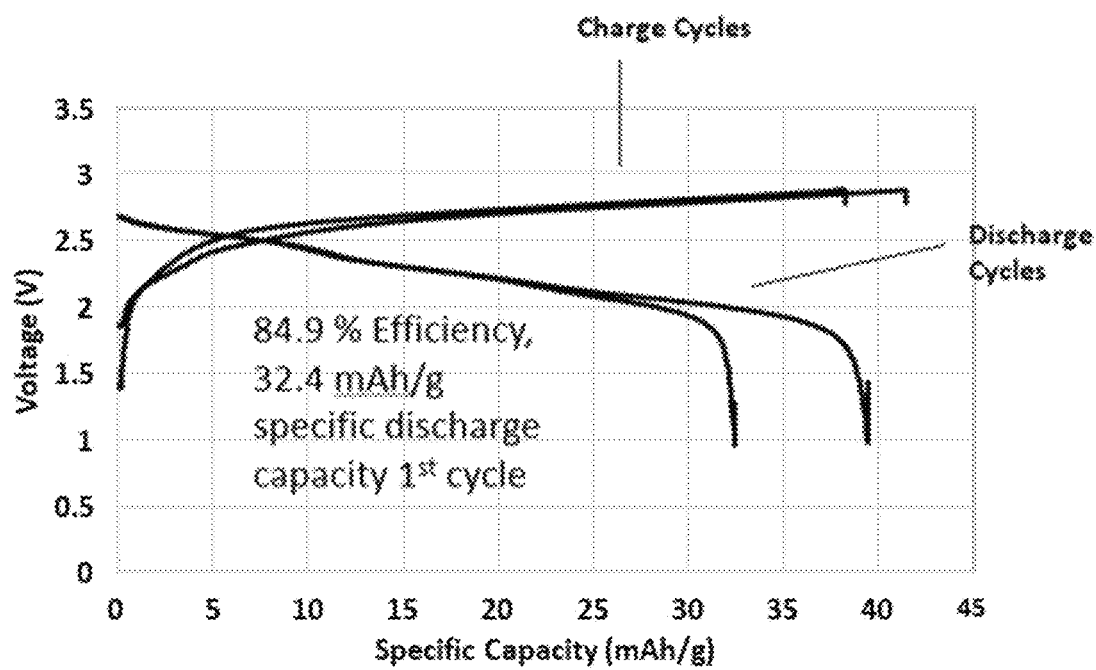
FIG. 20A shows the initial cycles for an electrochemical cell in accordance with certain embodiments of the invention.
Figure 20B:
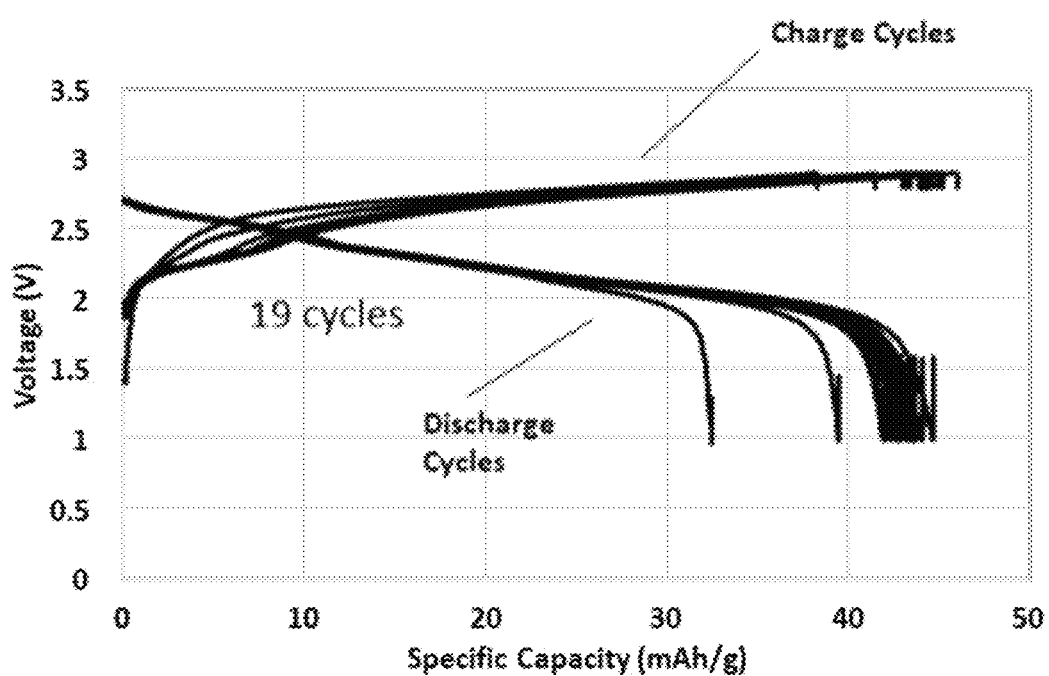
FIG. 20B shows the first 19 cycles for the electrochemical cell of FIG. 20A.

FIG. 20A shows the first cycle for an electrochemical cell formed from the following: LTO (4.05 mg); LMO (8.2 mg); FLS Liquid 1.75 M Dowanol; and glass fiber separator. FIG. 20B shows the first 19 cycles for the electrochemical cell of FIG. 20A. This data shows the performance of LTO/LMO cells using a liquid (non-GPE) electrolyte based on LiTFSI dissolved in Dowanol® TPnB (1.75M). The electrode were presoaked in the salt solution prior to cell assembly separated by a glass fiber separator. The resulting stack was placed in a 2032 coin cell, and cycled. Efficiency and capacity fade were modest, but this example shows that liquid electrolytes based on oligomeric PPG can function.

Example 15

Figure 21A:
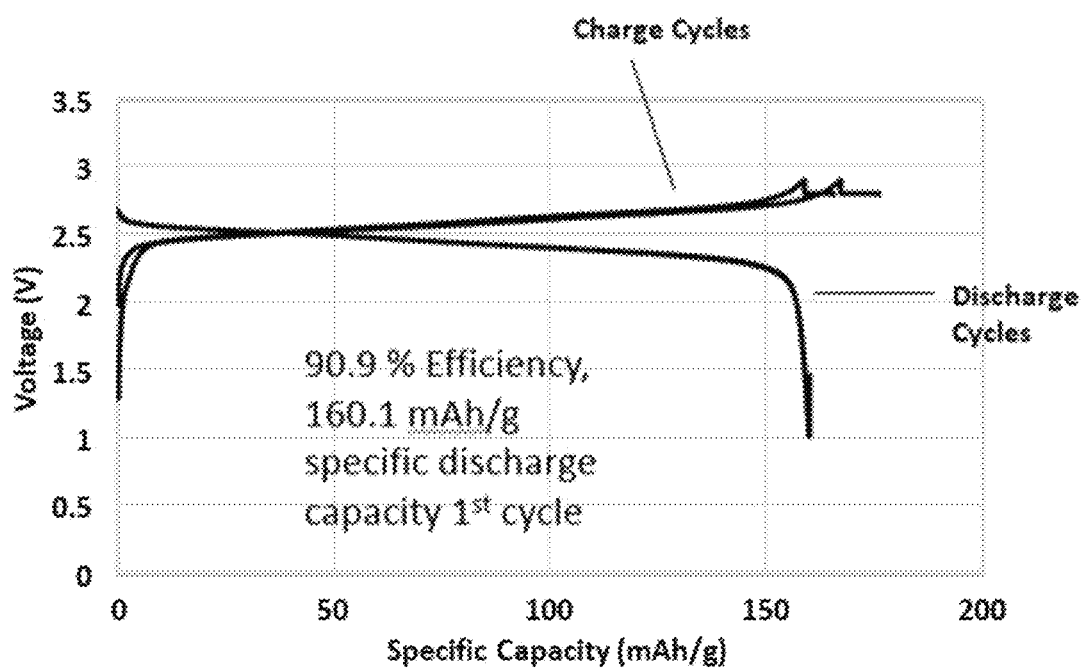
FIG. 21A shows the initial cycles for an electrochemical cell in accordance with certain embodiments of the invention.
Figure 21B:
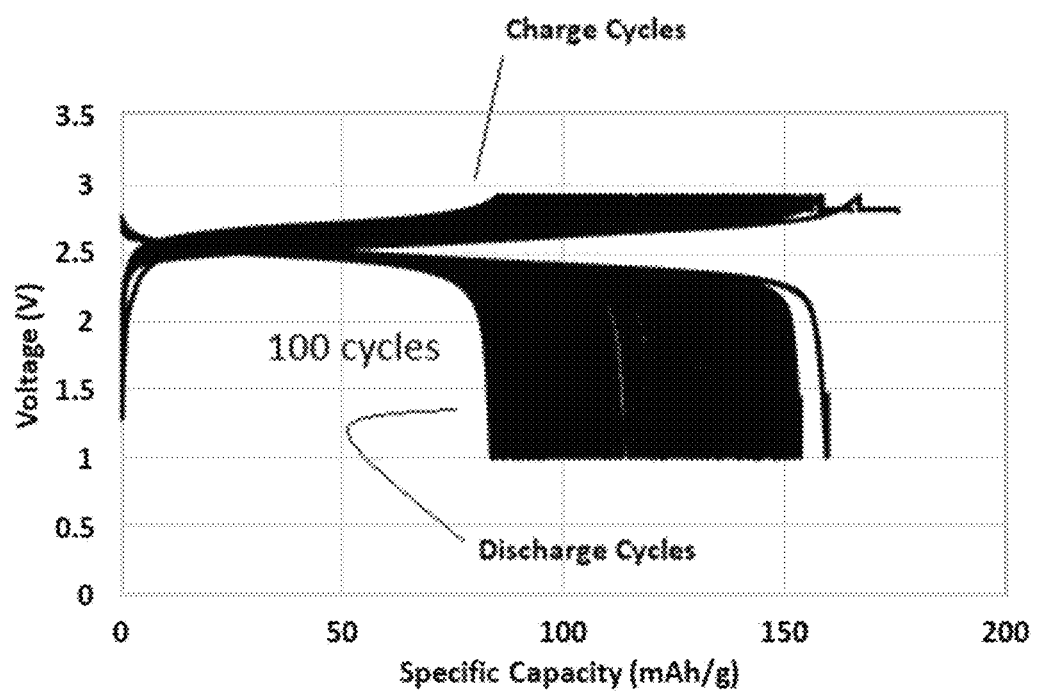
FIG. 21B show's the first 100 cycles for the electrochemical cell of FIG. 21A.

FIG. 21A shows the first cycle for an electrochemical cell formed from the following: LTO (4.65 mg); LMO (8.2 mg); FLS Liquid 1.00 M Dowanol; and a glass fiber separator. FIG. 21B shows the first 100 cycles for the electrochemical cell of FIG. 21A. This data is similar to that of Example 14, except that the electrolyte concentration was reduced to 1.0 M (solution on LiTFSI dissolved in Dowanol® TPnB). The electrodes were presoaked in the electrolyte before ceil assembly, and separated by a glass fiber separator. The resulting stack was placed in a 2032 coin cell, and cycled. Starting efficiency was excellent (i.e., 90.9%), and improved versus more concentrated salt, and specific capacity was nearly 100% at 160 mAh/g. This shows that cell performance is greatly enhanced at lower salt concentrations, again using liquid electrolyte.

These and other modifications and variations to embodiments of the invention may be practiced by those of ordinary skill in the an without departing from the spirit and scope of the invention, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

That which is claimed:

1. An electrode, comprising:
an electrode-composition including an active electrode species, wherein the electrode-composition comprises a first surface; and
a passivation layer positioned onto at least a portion of the first surface, said passivation layer comprising: (i) a matrix material comprising (a) a cured propoxylated polymer, (b) an uncured hydrophobic glycol ether, or a combination of (a) and (b); and (ii) at least a first electrolyte.

2. The electrode of claim 1, wherein the active electrode species comprises an active anode species or an active cathode species.

3. The electrode of claim 1, wherein the passivation layer comprises a thickness comprising from about 0.05 to about 100 microns.

4. The electrode of claim 1, wherein the first electrolyte comprises a salt selected from a lithium salt or a zinc salt, or combination thereof.

5. The electrode of claim 1, wherein the first electrolyte comprises from about 1% to about 40% by weight of the passivation layer on a dry basis and the matrix material comprises from about 60% to about 99% by weight of the passivation layer on a dry basis.

6. The electrode of claim 1, wherein the matrix material includes a cured propoxylated polymer comprising a polymerized hydrophobic ether.

7. The electrode of claim 6, wherein the polymerized hydrophobic ether comprises one or more of the following monomeric constituents: poly(propylene glycol) acrylate, poly(propylene glycol) methacrylate, poly(propylene glycol) diacrylate, poly(propylene glycol) dimethacrylate, and trimethylolpropane propoxylate triacrylate, glycerol propoxylate triacrylate, glycerol propoxylate trimethacrylate, bisphenol A propoxylate diacrylate, bisphenol A propoxylate dimethacrylate, pentaerythritol propoxylate diacrylate, pentaerythritol propoxylate tetraacrylate, neopentylglycol propoxylate diacrylate, neopentyl glycol propoxylate diacrylate, glycerol ethoxylate-co-propoxylate diacrylate, glycerol ethoxylate-co-propoxylate dimethacrylate, propylene glycol diacrylate, propylene glycol dimethacrylate, ethylenediamine tetrakis(ethoxylate-block-propoxylate) tetraacrylate, ethylenediamine tetrakis (ethoxylate-block-propoxylate) tetramethacrylate, tri (propylene glycol) diacrylate, tri(propylene glycol) dimethacrylate, or combinations thereof.

8. The electrode of claim 6, wherein the matrix material further comprises at least one non-poly(propylene glycol) (PPG) monomeric constituent, wherein the matrix material comprises from about 1% to about 10% by weight of the matrix material of the at least one non-PPG monomeric constituent.

9. The electrode of claim 8, wherein the at least one non-PPG monomeric constituent comprises a fluorinated monomer, a polyfunctional crosslinking monomer including at least two free-radically polymerizable functional groups, a long chain monofunctional monomer, or combinations thereof.

10. The electrode of claim 1, wherein the passivation layer comprises a free fluorine content that is not chemically bonded to the matrix material.

11. The electrode of claim 1, wherein the matrix material includes an uncured hydrophobic glycol ether; wherein the uncured hydrophobic glycol ether comprises poly(propylene glycol), tri(propylene glycol) butyl ether, propylene glycol phenyl ether, di(propylene glycol) phenyl ether, di(propylene glycol) n-butyl ether, propylene glycol n-butyl ether, propylene glycol methyl ether acetate, propylene glycol propyl ether, propylene glycol diacetate, propylene glycol dicaprate, propylene glycol monolaurate, 1,2-propylene glycol diacetate, propylene glycol dilaurate, di(propylene glycol) dibenzoate, tri(propylene glycol) diacetate, di(propylene glycol) butyl ether, di(propylene glycol) propyl ether, poly(propylene glycol)-block-poly(ethylene glycol)-block-poly(propylene glycol), di(propylene glycol) dimethyl ether, tri(propylene glycol) methyl ether, di(propylene glycol) methyl ether acetate, di(propylene glycol) phenyl ether, or any combinations thereof.

12. The electrode of claim 1, wherein the matrix material further comprises a free radical initiator.

13. The electrode of claim 1, wherein the electrode has not received an initial charge.

14. An electrochemical cell, comprising:
(i) an anode comprising an active anode species;
(ii) a cathode comprising an active cathode species; and
(iii) an electrolyte composition positioned between and in contact with the anode and the cathode;
wherein at least the anode includes a first passivation layer comprising a first matrix material and at least a first electrolyte distributed throughout the first matrix material, the first passivation layer being positioned between the active anode species and the electrolyte composition;
wherein the first matrix material comprises: (a) a cured propoxylated polymer, (b) an uncured hydrophobic glycol ether, or a combination of (a) and (b).

15. The electrochemical cell of claim 14, wherein the electrolyte composition comprises: (i) a gel polymer electrolyte (GPE) having a cross-linked three-dimensional polymer network, an electrolyte absorbed by the GPE, and water; (ii) a GPE having a cross-linked three-dimensional polymer network, and a deep eutectic solvent (DES), (iii) a DES; or (iv) a GPE having a cross-linked three-dimensional polymer network, a DES, and water.

16. A method of forming an electrode, comprising:
providing or forming an electrode-composition including an active electrode species, wherein the electrode-composition comprises a first surface;
providing or forming a passivation-composition comprising a mixture of a matrix material and at least a first electrolyte in a liquid medium;
coating at least a portion of the first surface with the passivation-composition to provide a liquid-containing pre-passivation layer on at least a portion of the first surface; and
at least one of drying or radically curing the liquid-containing pre-passivation layer to form a passivation layer comprising a dry mixture of the matrix material and the first electrolyte; wherein the matrix material comprises: (a) a cured propoxylated polymer, (b) an uncured hydrophobic glycol ether, or a combination of (a) and (b).

17. The method of claim 16, wherein the liquid medium comprises an organic solvent and the liquid-containing pre-passivation layer comprises at least a first portion of the organic solvent and a second portion of the organic solvent along with a matrix material-portion that penetrates into a plurality of pores of the electrode-composition, and wherein drying the liquid-containing pre-passivation layer comprises actively or passively evaporating the organic solvent after the second portion of the organic solvent along with the matrix material-portion that penetrates into the plurality of pores of the electrode-composition.

18. The method of claim 17, wherein the organic solvent comprises a fluorinated organic solvent.

19. A method of forming an electrochemical cell, comprising:
- providing or forming an anode comprising a first passivation layer defining a first anode-surface;
- providing or forming a cathode; and
- depositing an electrolyte composition between and in contact with the first anode-surface and the cathode;
- wherein the first passivation layer comprises: (i) a matrix material comprising (a) a cured propoxylated polymer, (b) an uncured hydrophobic glycol ether, or a combination of (a) and (b); and (ii) at least a first electrolyte.

* * * * *